United States Patent
Yoshino et al.

(10) Patent No.: US 9,689,422 B2
(45) Date of Patent: Jun. 27, 2017

(54) FOIL BEARING UNIT

(71) Applicants: Masato Yoshino, Mie (JP); Mitsuo Kawamura, Mie (JP); Hiroki Fujiwara, Mie (JP)

(72) Inventors: Masato Yoshino, Mie (JP); Mitsuo Kawamura, Mie (JP); Hiroki Fujiwara, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/911,784

(22) PCT Filed: Aug. 27, 2014

(86) PCT No.: PCT/JP2014/072431
§ 371 (c)(1),
(2) Date: Feb. 12, 2016

(87) PCT Pub. No.: WO2015/033835
PCT Pub. Date: Mar. 12, 2015

(65) Prior Publication Data
US 2016/0186799 A1 Jun. 30, 2016

(30) Foreign Application Priority Data

Sep. 6, 2013 (JP) .................................. 2013-185191
Dec. 3, 2013 (JP) .................................. 2013-250144

(51) Int. Cl.
*F16C 32/06* (2006.01)
*F16C 17/10* (2006.01)
(Continued)

(52) U.S. Cl.
CPC .............. *F16C 17/10* (2013.01); *F01D 25/22* (2013.01); *F02B 37/00* (2013.01); *F02C 6/12* (2013.01);
(Continued)

(58) Field of Classification Search
CPC ....... F16C 17/10; F16C 17/024; F16C 17/042
See application file for complete search history.

(56) References Cited

U.S. PATENT DOCUMENTS 4,167,295 A * 9/1979 Glaser .................. F16C 39/063
384/105
4,786,238 A 11/1988 Glaser et al.
(Continued)

FOREIGN PATENT DOCUMENTS

EP        1 579 120       9/2005
JP        3-110102       11/1991
(Continued)

OTHER PUBLICATIONS

International Search Report issued Nov. 18, 2014 in International (PCT) Application No. PCT/JP2014/072431.
(Continued)

*Primary Examiner* — Thomas R. Hannon
(74) *Attorney, Agent, or Firm* — Wenderoth, Lind & Ponack, L.L.P.

(57) ABSTRACT

A foil bearing unit includes: a first foil holder formed of a single component; a radial bearing foil mounted to an inner peripheral surface of the first foil holder; a thrust bearing foil mounted to an end surface of the first foil holder; and an inner member including: a shaft portion; and a flange portion projecting radially outward from the shaft portion. The inner member is supported in a radial direction by a fluid pressure that is generated in a radial bearing gap between a bearing surface of the radial bearing foil and an outer peripheral surface of the shaft portion, and the inner member is further supported in a thrust direction by a fluid pressure that is generated in a thrust bearing gap between a bearing surface of the thrust bearing foil and one end surface of the flange portion.

12 Claims, 12 Drawing Sheets

(51) Int. Cl.

| | | |
|---|---|---|
| *F01D 25/22* | (2006.01) | |
| *F16C 17/02* | (2006.01) | |
| *F16C 17/04* | (2006.01) | |
| *F02B 37/00* | (2006.01) | |
| *F02C 6/12* | (2006.01) | |
| *F02C 7/06* | (2006.01) | |
| *F16C 43/02* | (2006.01) | |
| *F16C 33/16* | (2006.01) | |
| *F16C 27/02* | (2006.01) | |

(52) U.S. Cl.
CPC .............. *F02C 7/06* (2013.01); *F16C 17/024* (2013.01); *F16C 17/042* (2013.01); *F16C 33/16* (2013.01); *F16C 43/02* (2013.01); *F05D 2220/40* (2013.01); *F05D 2300/224* (2013.01); *F05D 2300/6033* (2013.01); *F16C 27/02* (2013.01); *F16C 2360/24* (2013.01); *Y02T 10/144* (2013.01)

(56) References Cited

U.S. PATENT DOCUMENTS

| | | | |
|---|---|---|---|
| 5,497,615 | A | 3/1996 | Noe et al. |
| 5,529,398 | A | 6/1996 | Bosley |
| 7,108,488 | B2 * | 9/2006 | Larue .................... F16C 17/024 384/103 |
| 2003/0169951 | A1 | 9/2003 | Nishijima et al. |
| 2004/0120617 | A1 | 6/2004 | Fournier et al. |
| 2006/0183074 | A1 | 8/2006 | Brennan |
| 2008/0108013 | A1 | 5/2008 | Brennan |
| 2011/0243762 | A1 | 10/2011 | Daikoku et al. |
| 2012/0231415 | A1 | 9/2012 | Brennan |

FOREIGN PATENT DOCUMENTS

| | | |
|---|---|---|
| JP | 9-510522 | 10/1997 |
| JP | 10-288187 | 10/1998 |
| JP | 10-511446 | 11/1998 |
| JP | 2003-278751 | 10/2003 |
| JP | 2006-329321 | 12/2006 |
| JP | 2008-519662 | 6/2008 |
| JP | 2011-214523 | 10/2011 |
| JP | 2013-61024 | 4/2013 |
| KR | 10-1078969 | 11/2011 |
| WO | 2004/055398 | 7/2004 |

OTHER PUBLICATIONS

English translation of the International Preliminary Report on Patentability and Written Opinion of the International Searching Authority issued Mar. 8, 2016 in International Application No. PCT/JP2014/072431.

Extended European Search Report issued Jan. 13, 2017 in corresponding European Application No. 14843102.6.

* cited by examiner

FOIL BEARING UNIT

TECHNICAL FIELD

The present invention relates to a foil bearing unit.

BACKGROUND ART

Bearings for supporting main shafts of turbo-machines, such as a gas turbine and a turbocharger, are required to endure severe environments involving high temperature and high speed rotation. Attention has been focused on a foil bearing as a bearing suited to use under such conditions. The foil bearing has bearing surfaces formed of flexible thin films (foils) having low flexural rigidity, and is configured to support a load by allowing the bearing surfaces to be deflected. During the rotation of the shaft, fluid films (such as air films) are formed between an outer peripheral surface of the shaft and the bearing surfaces of the foils, and the shaft is supported in a non-contact manner.

For example, in Patent Literature 1 and Patent Literature 2, there are disclosed turbo-machines to which the foil bearings are applied.

In those turbo-machines, a rotary member is fixed to a turbine shaft, and those components are supported in a freely rotatable manner by foil bearings. The rotary member includes a flange portion projecting radially outward, and the flange portion is supported in thrust directions by the foil bearings.

CITATION LIST

Patent Literature 1: JP 09-510522 A
Patent Literature 2: JP 10-511446 A

SUMMARY OF INVENTION

Technical Problem

In the turbo-machine as described above, work of fixing foils directly to an inner peripheral surface of a housing arranged in the turbo-machine is difficult. As a countermeasure, normally, as disclosed in Patent Literatures 1 and 2, a foil bearing cartridge formed of a cylindrical case having an inner periphery to which foils are fixed is prepared, and the foil bearing cartridge is fixed to the inner peripheral surface of the housing. In this way, assembly work is facilitated. Meanwhile, work of fixing the foils to an end surface of the housing is relatively easy. Thus, in Patent Literatures 1 and 2, thrust foils are fixed directly to the end surface of the housing.

Incidentally, in the foil bearing for supporting the shaft in a radial direction and the thrust directions as described above, a relative positional relationship between foils configured to support the rotary shaft in the radial direction (radial bearing foil) and the foils configured to support the rotary shaft in the thrust directions (thrust bearing foils) is an important factor in supporting the rotary shaft with high accuracy. Thus, a relative positional accuracy (such as perpendicularity) between a mounting surface for the radial bearing foil and a mounting surface for the thrust bearing foils needs to be enhanced. However, in the configuration as described above, the inner peripheral surface of the case of the bearing cartridge serves as the mounting surface for the radial bearing foil, and the end surface of the housing serves as the mounting surface for the thrust bearing foils. Thus, in order to enhance the relative positional accuracy between those mounting surfaces, the components need to be machined or assembled with high accuracy. As a result, a manufacturing cost therefor is increased.

It is a first object of the present invention to provide a foil bearing unit capable of supporting a rotary shaft with high accuracy without involving increase in manufacturing cost.

Further, when the turbine shaft of the turbo-machine is rotated at high speed, a centrifugal force is applied to the rotary member. In particular, when the rotary member comprises the flange portion projecting radially outward as described above, a large centrifugal force is applied to the flange portion along with the rotation of the turbine shaft. When such a rotary member is made of a metal material (such as stainless steel), the flange portion is increased in weight. As a result, not only the rotary member but also the turbine shaft is increased in moment of inertia. The turbo-machine, in particular, a turbocharger is required to have high rotational responsiveness to output from an engine. However, when the turbine shaft is increased in moment of inertia as described above, the rotational responsiveness is deteriorated. In addition, when the rotary member is large in weight, the centrifugal force to be applied to the rotary member is increased. As a result, the rotary member may be damaged by the centrifugal force.

It is a second object of the present invention to increase rotational responsiveness and a centrifugal strength (resistance against a centrifugal force) of a rotary member supported by foil bearings.

Solution to Problem

According to a first invention of the present application, which is made to attain the first object, there is provided a foil bearing unit, comprising: a first foil holder formed of a single component; a radial bearing foil mounted to an inner peripheral surface of the first foil holder; a thrust bearing foil mounted to an end surface of the first foil holder; and an inner member comprising: a shaft portion to be inserted along an inner periphery of the first foil holder; and a flange portion projecting radially outward from the shaft portion. The inner member is supported in a radial direction by a fluid pressure that is generated in a radial bearing gap between a bearing surface of the radial bearing foil and an outer peripheral surface of the shaft portion. The inner member is further supported in a thrust direction by a fluid pressure that is generated in a thrust bearing gap between a bearing surface of the thrust bearing foil and one end surface of the flange portion.

When the radial bearing foil and the thrust bearing foil are mounted to the first foil holder formed of the single component in this way, not only a relative positional accuracy between mounting surfaces for the radial bearing foil and the thrust bearing foil, but also a relative positional accuracy between the bearing surface of the radial bearing foil (radial bearing surface) and the bearing surface of the thrust bearing foil (thrust bearing surface) may be enhanced regardless of machining accuracies and assembly accuracies of the components. When the foil bearing unit in which the relative positional accuracy between the radial bearing surface and the thrust bearing surface is enhanced in this way is formed, and this foil bearing unit is assembled, for example, into a turbo-machine, not only the inner member but also a rotary shaft of, for example, the turbo-machine may be supported with high accuracy. Note that, the "member formed of a single component" does not refer to a member formed through combination of a plurality of components, but refers to a member made integrally of the single material.

In the foil bearing unit described above, for example, the shaft portion of the inner member may comprise a hollow sleeve portion, and the hollow sleeve portion and the flange portion may be formed integrally with each other. When the sleeve portion and the flange portion of the inner member are formed integrally with each other in this way, a relative positional accuracy between the outer peripheral surface of the sleeve portion and the end surface of the flange portion, which face the respective bearing surfaces, is enhanced. Further, when an inner peripheral surface of the sleeve portion is fitted and fixed to an outer peripheral surface of the rotary shaft of, for example, the turbo-machine, an axial dimension of a fixing region is larger than that in a case where the flange portion alone is fitted and fixed to the outer peripheral surface of the rotary shaft, for example. Thus, a relative positional accuracy of the inner member with respect to the rotary shaft (such as coaxiality of the sleeve portion and perpendicularity of the flange portion with respect to the rotary shaft) may be enhanced.

The foil bearing unit described above may further comprise, for example, a second foil holder mounted to the first foil holder, and another thrust bearing foil mounted to an end surface of the second foil holder. The inner member may be further supported in a thrust direction by a fluid pressure that is generated in a thrust bearing gap between another end surface of the flange portion of the inner member and a bearing surface of the another thrust bearing foil. With this, along with the rotation of the inner member, the thrust bearing gaps are formed respectively between the one end surface of the flange portion and the bearing surface of the thrust bearing foil mounted to the first foil holder, and between the another end surface of the flange portion and the bearing surface of the thrust bearing foil mounted to the second foil holder. The inner member may be supported in both the thrust directions by the fluid pressures that are generated respectively in the thrust bearing gaps. Further, in this case, when the first foil holder and the second foil holder are engaged to the flange portion from both axial sides, the inner member may be restricted from being disengaged from the first foil holder and the second foil holder (bearing case). Thus, the bearing case and the inner member may be handled integrally, and hence efficiency at the time of assembling the foil bearing unit, for example, into the turbo-machine may be enhanced.

When the foil bearing unit further comprises a spacer arranged axially between the first foil holder and the second foil holder, an axial distance between both the foil holders may be set with high accuracy with the spacer. With this, a size of the thrust bearing gap between the bearing surface of the thrust bearing foil mounted to each foil holder and the end surface of the flange portion may be set with high accuracy. Thus, supporting accuracies in the thrust directions may be enhanced.

For example, when the foil bearing unit described above is assembled into the turbo-machine comprising a turbine to be driven by a high-temperature gas, the foil bearing unit arranged near the turbine is increased in temperature. In this case, when the spacer has a communication hole formed to communicate an inner periphery and an outer periphery of the spacer to each other, a fluid in the bearing case may be discharged to an outside through the communication hole by a centrifugal force generated along with rotation of the flange portion. With this, high-temperature air in the bearing case may be exhausted, and low-temperature air may be introduced from the outside. Thus, not only the air in the bearing case, but also the foil bearing unit itself may be cooled. In particular, when the foil bearing unit further comprises a communication path, which is formed between the inner peripheral surface of the sleeve portion and the outer peripheral surface of the rotary shaft that is fixed to the inner peripheral surface of the sleeve portion, and is configured to communicate the radial bearing gap and the outside to each other, the introduction of the outside air into the radial bearing gap may be promoted, and hence a cooling effect may be increased.

The foil bearing unit described above may further comprise another radial bearing foil mounted to an inner peripheral surface of the second foil holder. The inner member may further be supported in the radial direction by a fluid pressure that is generated in a radial bearing gap between the outer peripheral surface of the shaft portion and a bearing surface of the another radial bearing foil. In this way, the radial bearing gaps are formed on both axial sides of the flange portion. Thus, even when the flange portion has a large diameter, the inner member may be stably supported.

The foil bearing unit may further comprise: a mounting member arranged on an outer periphery of the first foil holder; and a damper configured to couple the first foil holder and the mounting member to each other. The damper may be deformed to allow the first foil holder to move relative to the mounting member. With this configuration, vibration of the foil bearing unit may be absorbed through the deformation of the damper.

Further, according to a second invention of the present application, which is made to achieve the above-mentioned second object, there is provided a rotary member fixed to a shaft and supported in a freely rotatable manner by foil bearings, at least a part of the rotary member being made of a carbon fiber reinforced composite.

By making at least the part of the rotary member using the carbon fiber reinforced composite in this way, the rotary member may be reduced in weight in comparison with a case where the rotary member is made of a metal material. With this, the rotary member is reduced in moment of inertia, and not only the rotary member but also the shaft (such as a turbine shaft) to which the rotary member is mounted is enhanced in rotational responsiveness. Further, through the weight reduction of the rotary member, a centrifugal force to be applied to the rotary member may be reduced. Thus, the rotary member may be increased in centrifugal strength. In particular, as the carbon fiber reinforced composite, when a matrix of carbon fiber and a carbon or a graphite matrix (C/C composite) is used for, heat resistance may be enhanced. In addition, due to lubricity of the carbon (graphite) forming the matrix, its slidability may be enhanced.

The rotary member described above may have a structure comprising the flange portion to be supported in the thrust directions by the thrust foil bearings. The flange portion has a large outer diameter dimension, and hence has a relatively large influence on the moment of inertia of the rotary member. In addition, a centrifugal force to be applied to the flange portion during its rotation is relatively large. In such a case, it is preferred that the flange portion be made of the carbon fiber reinforced composite.

Further, the rotary member described above may further have a structure comprising the sleeve portion to be supported in the radial direction by the radial foil bearing. The sleeve portion is smaller in outer diameter dimension than the flange portion, and hence has a relative small influence on the moment of inertia of the rotary member. In addition, a centrifugal force to be applied to the sleeve portion during its rotation is relatively small. In this way, required characteristics on the flange portion and the sleeve portion are different from each other. Thus, it is preferred that those portions be made of materials different from each other, specifically, materials that satisfy the respective required characteristics. For example, in a case where the sleeve portion is used to frequently come into contact with the radial foil bearing, when the sleeve portion is made of the carbon fiber reinforced composite, the matrix is abraded earlier than the carbon fiber on the outer peripheral surface of the sleeve portion. In this case, strands of the carbon fibers are projected relative to the outer peripheral surface of the sleeve portion, and properties of attacking the radial foil bearing are increased, which may cause deterioration in abrasion resistance. As a countermeasure, when the sleeve portion is made of a sintered carbon material, due to a solid lubricating effect of the carbon (graphite), slidability relative to the radial foil bearing is enhanced, and the outer peripheral surface of the sleeve portion may be uniformly abraded. Thus, the abrasion resistance may be enhanced.

The rotary member as described above is fixed, for example, to a shaft arranged in a horizontal direction. In this case, during low speed rotation at the time of, for example, actuation or stop of the shaft, the fluid pressure between the foil bearing and the rotary member is low. Thus, the shaft and the rotary member are lowered by gravity, and contact between the outer peripheral surface of the sleeve portion and the radial foil bearing (what is called "touchdown") occurs. Thus, the outer peripheral surface of the sleeve portion is required to have high abrasion resistance. Meanwhile, a frequency of contact between the end surface of the flange portion and the thrust foil bearing is relatively low, and hence the flange portion is not required to have significantly high abrasion resistance. Thus, when the rotary member is fixed to the horizontal shaft, it is particularly preferred that, as described above, the flange portion be made of the carbon fiber reinforced composite, and the sleeve portion be made of the sintered carbon material.

The end surface of the flange portion and the outer peripheral surface of the sleeve portion respectively face the bearing surface of the thrust foil bearing and the bearing surface of the radial foil bearing. Thus, a relative positional accuracy (such as perpendicularity and coaxiality) therebetween is an important factor. For example, when the flange portion and the sleeve portion are separately formed and are fixed to the shaft independently of each other, a relative positional accuracy between the end surface of the flange portion and the outer peripheral surface of the sleeve portion may be deteriorated at the time of assembly. As a countermeasure, when the flange portion and the sleeve portion are integrated in advance under a state in which the flange portion and the sleeve portion are held in abutment against each other in the axial direction, the relative positional accuracy therebetween may be prevented from being deteriorated at the time of assembly into the shaft. Further, when the flange portion and the sleeve portion are integrated with each other under a state in which an inner peripheral surface of the flange portion and the outer peripheral surface of the sleeve portion are fitted to each other, the relative positional accuracy and a coupling force therebetween may be further increased.

When the rotary member and the foil bearing for supporting the rotary member in a freely rotatable manner are unified into a foil bearing unit, the rotary member and the foil bearing may be handled integrally, and hence may be easily assembled, for example, into the turbo-machine.

The rotary member as described above may be suitably used for supporting rotation of a shaft to be rotated at high speed, such as the turbine shaft of the turbo-machine.

Advantageous Effects of Invention

As described above, according to the first invention of the present application, the rotary shaft is supported with high accuracy without involving increase in manufacturing cost.

Further, according to the second invention of the present application, the flange portion is made of the carbon fiber reinforced composite. With this, the rotary member is increased in rotational responsiveness and centrifugal strength.

DESCRIPTION OF EMBODIMENTS

Now, description is made of embodiments of a first invention of the present application with reference to FIG. 1 to FIG. 15.

Figure 1:
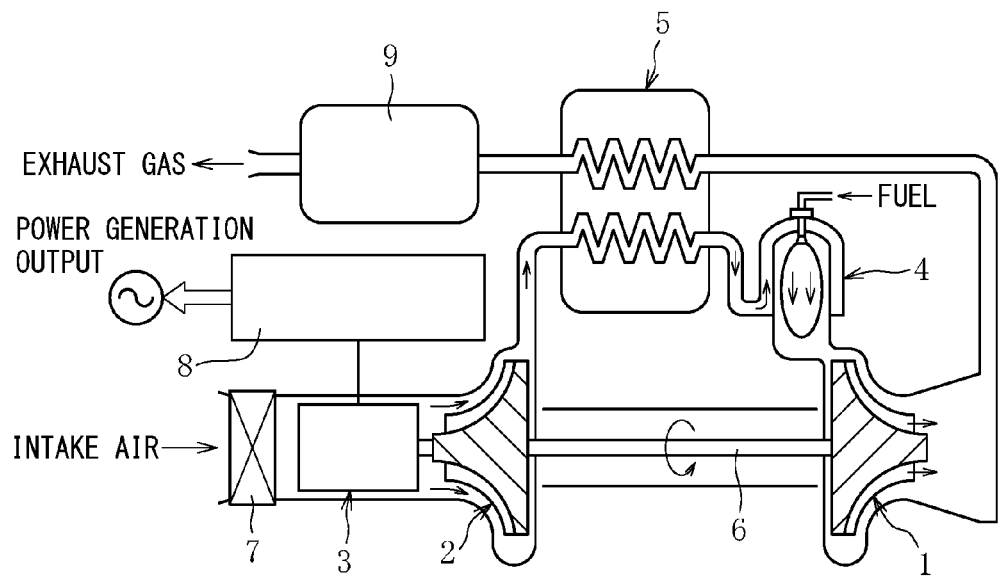
FIG. 1 is a schematic view for illustrating a configuration of a gas turbine.

FIG. 1 is a schematic illustration of a configuration of a gas turbine as a type of a turbo-machine. The gas turbine mainly comprises a turbine 1 comprising a blade cascade, a compressor 2, a power generator 3, a combustor 4, and a regenerator 5. The turbine 1, the compressor 2, and the power generator 3 comprise a common rotary shaft 6 extending in a horizontal direction. The rotary shaft 6, the turbine 1, and the compressor 2 serve as an integrally rotatable rotor. Air sucked from an air-intake port 7 is compressed by the compressor 2, heated by the regenerator 5, and then fed into the combustor 4. The compressed air is mixed with fuel and combusted so as to rotate the turbine 1 with a high-temperature and high-pressure gas. A rotational force of the turbine 1 is transmitted to the power generator 3 through intermediation of the rotary shaft 6 so as to rotate the power generator 3. In this way, electric power is generated and output through intermediation of an inverter 8. The gas having rotated the turbine 1 has a relatively high temperature. Thus, the gas is fed into the regenerator 5 so that heat thereof is exchanged with that of the compressed air prior to the combustion. In this way, the heat of the gas after the combustion is reused. The gas that has been subjected to the heat exchange in the regenerator 5 passes through an exhaust heat recovery device 9, and then is exhausted as an exhaust gas.

Figure 2:
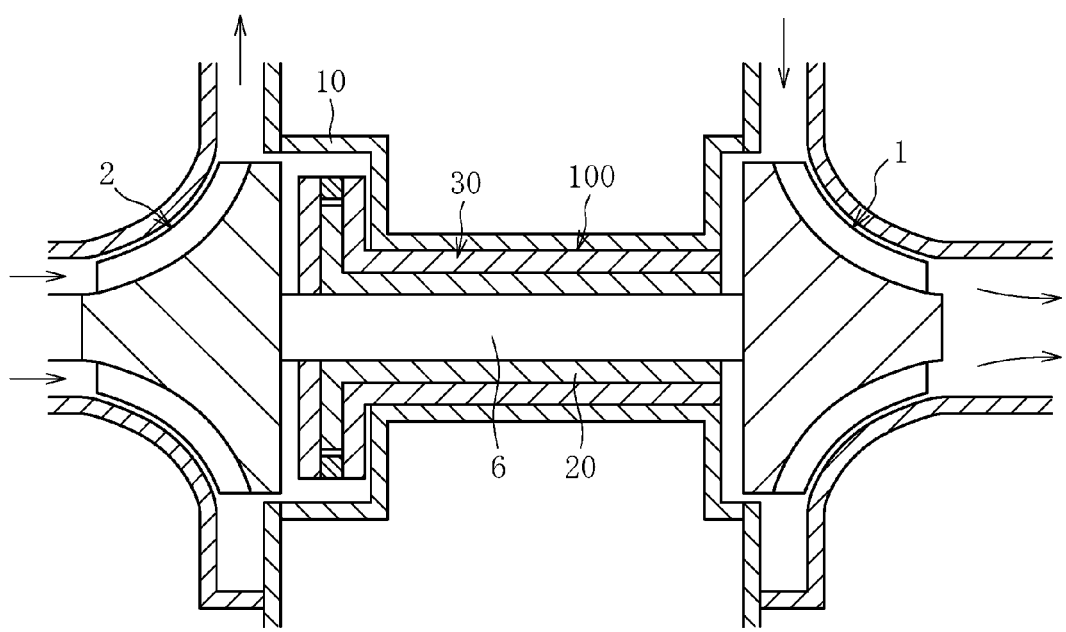
FIG. 2 is a sectional view for illustrating a support structure for a rotor of the gas turbine.
Figure 3:
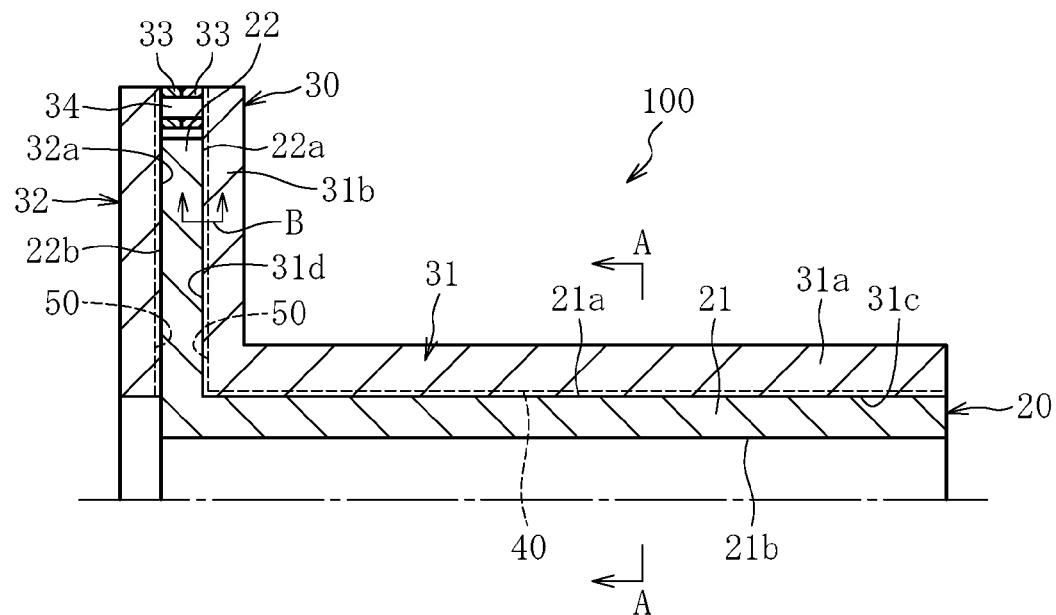
FIG. 3 is a sectional view for illustrating a foil bearing unit according to an embodiment of a first invention of the present application, which is assembled in the support structure.
Figure 4:
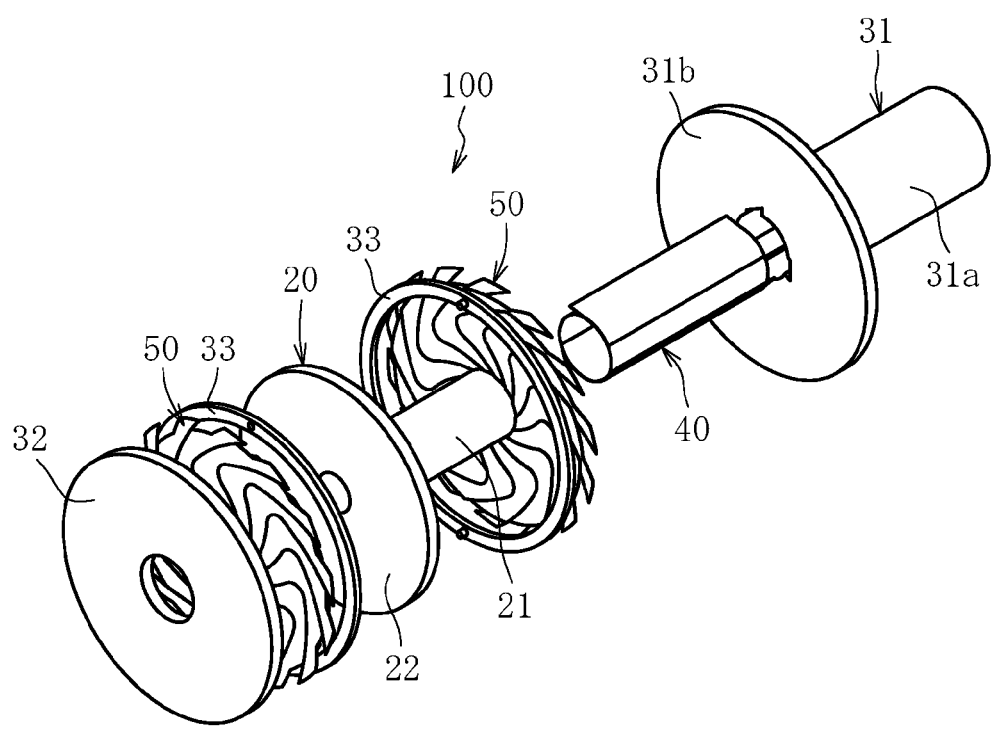
FIG. 4 is a perspective view for illustrating a state in which the foil bearing unit is disassembled in an axial direction.

FIG. 2 to FIG. 4 are illustrations of a foil bearing unit 100 configured to support the rotary shaft 6 of the rotor in the gas turbine. The foil bearing unit 100 is fixed to an inner periphery of a housing 10 of the gas turbine. The foil bearing unit 100 comprises an inner member 20 fixed to the rotary shaft 6, a bearing case 30 configured to receive the inner member 20, and a radial bearing foil 40 and thrust bearing foils 50 mounted to the bearing case 30.

The inner member 20 comprises a shaft portion (corresponding to a hollow sleeve portion 21 in this embodiment), and a disc-like flange portion 22 projecting radially outward from a cylindrical outer peripheral surface 21a of the sleeve portion 21. In this embodiment, the inner member 20 is formed of a single component, that is, the sleeve portion 21 and the flange portion 22 are formed integrally with each other. The inner member 20 is formed, for example, through cutting work or forging on an ingot, or through integral molding of a sintered metal. In the illustrated example, the flange portion 22 is arranged at an axial end portion of the sleeve portion 21 on the compressor 2 side (left side in FIG. 3). An outer peripheral surface of the rotary shaft 6 is fitted and fixed to an inner peripheral surface 21b of the sleeve portion 21.

The bearing case 30 comprises a first foil holder 31 and a second foil holder 32. The first foil holder 31 is formed of a single component. The first foil holder 31 of this embodiment has a cylindrical inner peripheral surface 31c, and a flat end surface 31d orthogonal to an axial direction. Specifically, the first foil holder 31 integrally comprises a cylindrical portion 31a, and a flat plate portion 31b extending radially outward from an axial end portion of the cylindrical portion 31a on the compressor 2 side (left side in FIG. 3). In the illustrated example, the flat plate portion 31b of the first foil holder 31 is formed of a disc orthogonal to the axial direction. The second foil holder 32 is formed of a single component. The second foil holder 32 of this embodiment is formed of a disc orthogonal to the axial direction. Each of the first foil holder 31 and the second foil holder 32 is formed, for example, through cutting work or forging on an ingot, or through integral molding of a sintered metal. A radial bearing foil 40 (indicated by the dotted line in FIG. 3) is mounted to the inner peripheral surface 31c of the cylindrical portion 31a of the first foil holder 31. The thrust bearing foils 50 (indicated by the dotted lines in FIG. 3) are mounted respectively to the end surface 31d of the flat plate portion 31b of the first foil holder 31 and an end surface 32a of the second foil holder 32.

Figure 5:
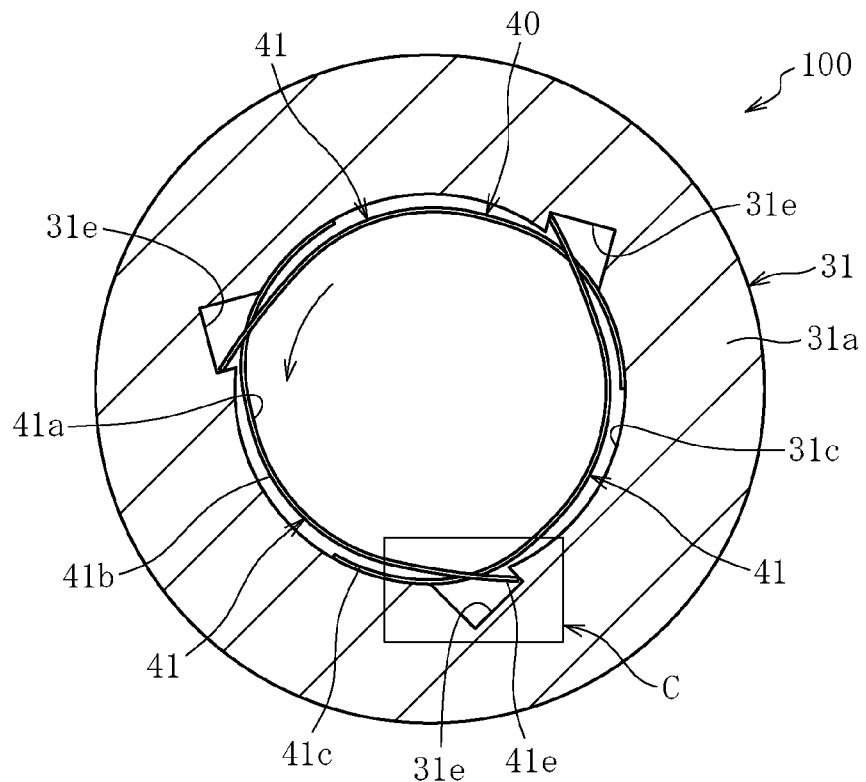
FIG. 5 is a sectional view taken along the line A-A in FIG. 3.

As illustrated in FIG. 5, grooves 31e for allowing the radial bearing foil 40 to be mounted thereto are formed in the inner peripheral surface 31c of the cylindrical portion 31a of the first foil holder 31. The grooves 31e extend over an entire axial length of the inner peripheral surface 31c of the cylindrical portion 31a, and are formed at a plurality of equiangular positions (three positions in the illustrated example).

The radial bearing foil 40 comprises a plurality of foils 41 (three foils in the illustrated example). Those foils 41 are mounted to the inner peripheral surface 31c of the first foil holder 31 under a circumferentially arrayed state. Radially inner surfaces of the foils 41 function as a radial bearing surface 41a. In the illustrated example, the three foils 41 form a multi-arc radial bearing surface. Members (such as back foils) configured to impart elasticity to the foils 41 are not arranged between the inner peripheral surface 31c of the first foil holder 31 and the foils 41. A radially outer surface 41b of each of the foils 41 and the inner peripheral surface 31c of the first foil holder 31 directly face each other in a radial direction.

Figure 6A:
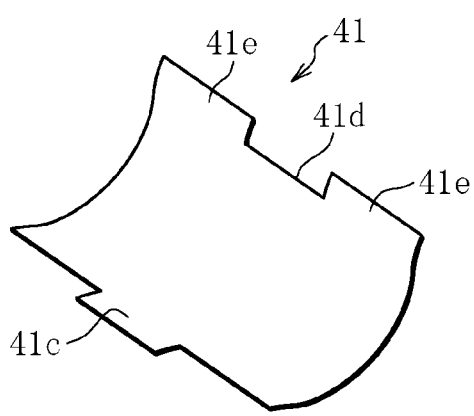
FIG. 6A is a perspective view for illustrating a foil of a radial bearing foil.
Figure 6B:
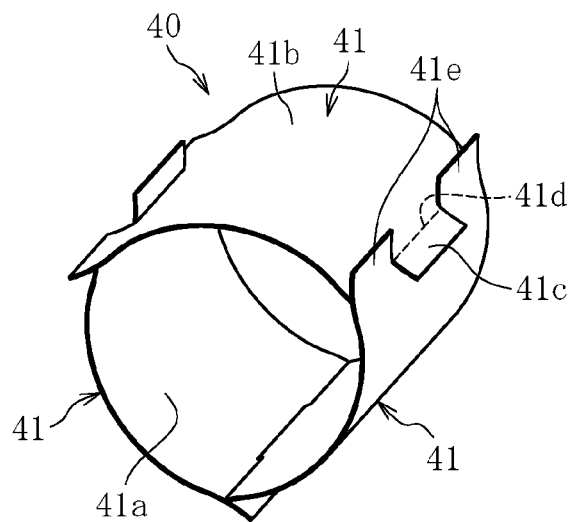
FIG. 6B is a perspective view for illustrating a state in which three foils are temporarily assembled so as to form the radial bearing foil.

Each of the foils 41 is integrally formed through press working or electric discharge machining on a single metal foil. As illustrated in FIG. 6A, each of the foils 41 comprises a projecting portion 41c formed at one circumferential end, and a recessed portion 41d formed at another circumferential end. The projecting portion 41c and the recessed portion 41d of each of the foils 41 are formed at the same position in the axial direction. With this, as illustrated in FIG. 6B, the projecting portion 41c of each of the foils 41 may be fitted to the recessed portion 41d of adjacent one of the foils 41, thereby temporarily assembling the three foils 41 into a cylindrical shape. As illustrated in FIG. 5, projecting portions 41e at the another circumferential end of each of the foils 41 are inserted into each of the grooves 31e formed in the inner peripheral surface 31c of the first foil holder 31. The projecting portion 41c at the one circumferential end of each of the foils 41 is arranged between the radially outer surface 41b of adjacent one of the foils 41 and the inner peripheral surface 31c of the first foil holder 31. With this, both the circumferential ends of each of the foils 41 are held in contact with the first foil holder 31.

Figure 7:
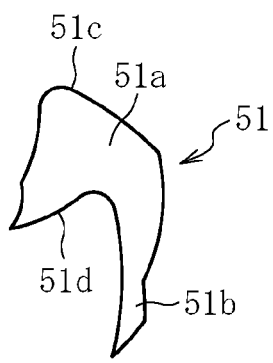
FIG. 7 is a plan view for illustrating a foil of a thrust bearing foil.

The thrust bearing foils 50 each comprise a plurality of foils 51, and are mounted respectively to the end surface 31*d* of the flat plate portion 31*b* of the first foil holder 31, and to the end surface 32*a* of the second foil holder 32 with ring-shaped fixing members 33 (refer to FIG. 3 and FIG. 4). As illustrated in FIG. 7, each of the foils 51 integrally comprises a body portion 51*a* and a fixing portion 51*b* to be fixed to the end surface 31*d* of the first foil holder 31 or the end surface 32*a* of the second foil holder 32. An edge 51*c* of the body portion 51*a* on a downstream side in a rotation direction, and an edge 51*d* of the body portion 51*a* on an upstream side in the rotation direction each comprise a central portion that is formed into a substantially V-shape projecting to the downstream side in the rotation direction. The central portion of each of the edges 51C and 51*d* is rounded into a circular-arc shape. The fixing portion 51*b* of each of the foils 51 extends in a direction in which a radially outer side thereof is inclined to the upstream side in the rotation direction (side opposite to the arrow in each of FIG. 8). In each of the thrust bearing foils 50, the fixing portions 51*b* of the plurality of foils 51 are arranged on the same circumference, and are fixed by being sandwiched between the ring-shaped fixing member 33 and the end surface 31*d* of the foil holder 31 or the end surface 32*a* of the foil holder 32.

Figure 8A:
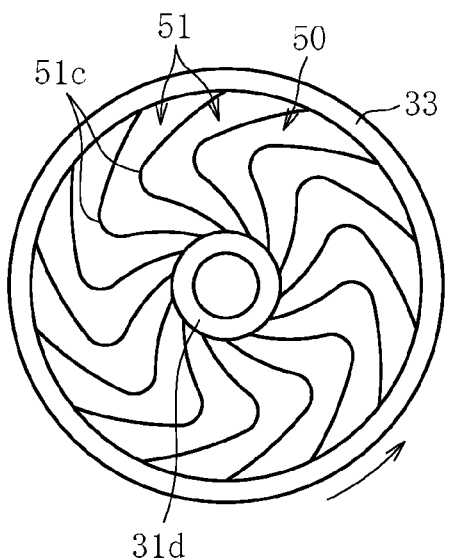
FIG. 8A is a plan view for illustrating an end surface of a first foil holder.
Figure 8B:
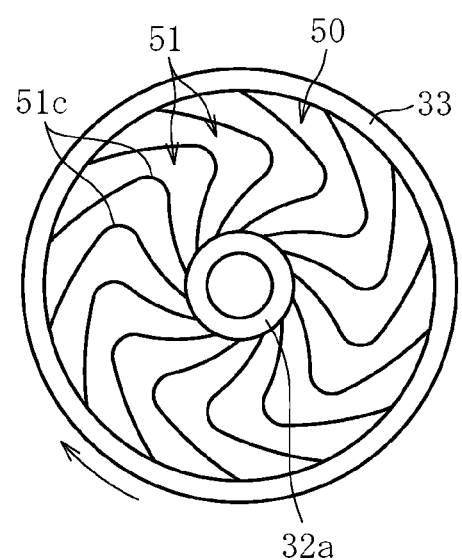
FIG. 8B is a plan view for illustrating an end surface of a second foil holder.
Figure 9:
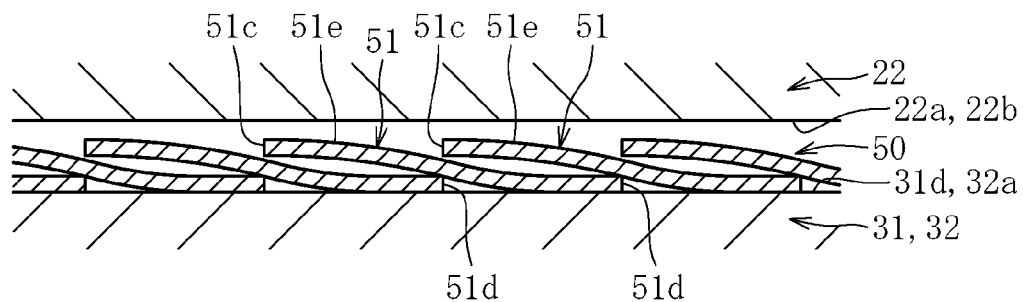
FIG. 9 is a sectional view taken along the line B in FIG. 3.

As illustrated in FIG. 8A and FIG. 8B, the plurality of foils 51 of each of the thrust bearing foils 50 are arranged at a circumferentially constant pitch on the end surface 31*d* of the first foil holder 31 and the end surface 32*a* of the second foil holder 32. As illustrated in FIG. 9, each of the edges 51*c* of the foils 51 on the downstream side in the rotation direction is arranged on adjacent one of the foils 51 (on the flange portion 22 side). In other words, downstream portions of the foils 51 in the rotation direction overrides on upstream portions of adjacent ones of the foils 51 in the rotation direction. Parts of the foils 51, which directly face each of end surfaces 22*a* and 22*b* of the flange portion 22 (parts illustrated in FIG. 8), function as a thrust bearing surface 51*e*.

Each of the foils 41 and 51 is formed of a metal foil made of a metal that is excellent in resiliency and processability, such as a steel material or a copper alloy, and having a thickness of from approximately 20 μm to 200 μm. As in this embodiment, in the air dynamic pressure bearing that uses air as a fluid film, a lubricating oil does not exist in an atmosphere, and hence a rust inhibiting effect by an oil may not be expected. Carbon steel and brass may be taken as typical examples of the steel material and the copper alloy. However, general carbon steel is liable to corrode due to rust, and brass may be subjected to delayed cracking due to processing strain (this liability becomes higher in proportion to a Zn content in brass). Thus, it is preferred that the metal foil be made of stainless steel or bronze.

The foil bearing unit 100 having the configuration described above is assembled by the procedure as described below.

First, the radial bearing foil 40 is temporarily assembled (refer to FIG. 6B), and mounted to the inner peripheral surface 31*c* of the first foil holder 31. Specifically, the radial bearing foil 40 is inserted along an inner periphery of the first foil holder 31 in a manner that the projecting portions 41*e* of each of the foils 41 of the temporarily assembled radial bearing foil 40 are inserted into each of the grooves 31*e* formed in the inner peripheral surface 31*c* of the first foil holder 31 from one axial side.

Figure 10A:
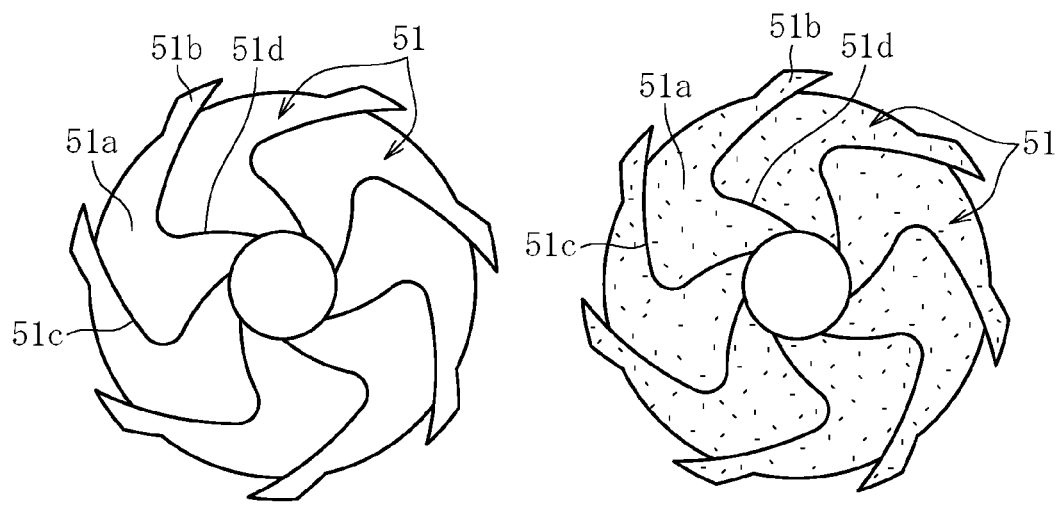
FIG. 10A is a plan view for illustrating two foil groups of the thrust bearing foil.
Figure 10B:
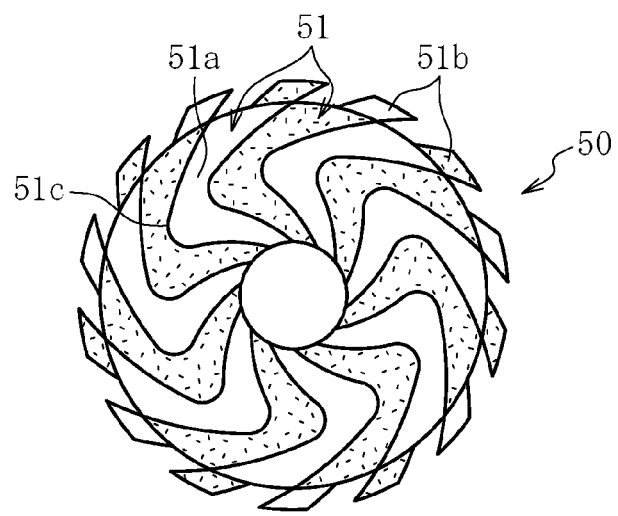
FIG. 10B is a plan view for illustrating the thrust bearing foil.

Then, the thrust bearing foils 50 are mounted to the end surface 31*d* of the first foil holder 31 and the end surface 32*a* of the second foil holder 32. Specifically, first, as illustrated in FIG. 10A, two foil groups each comprising the plurality of foils 51 formed through cutting on a single metal foil are prepared (in FIG. 10, for the sake of better understanding, one of the foil groups is indicated by the dotted pattern). The two foil groups are overlapped with each other in a phase shifted by an amount corresponding to half of the foils (refer to FIG. 10B) so that the edges 51*c* of the foils 51 on the downstream side in the rotation direction are overlapped with the adjacent ones of the foils 51. In this state, the fixing portions 51*b* of the foils 51 are sandwiched between the end surface 31*d* of the flat plate portion 31*b* of the first foil holder 31 and the ring-shaped fixing member 33. With this, the thrust bearing foil 50 is mounted to the first foil holder 31 (refer to FIG. 8A). Similarly, the fixing portions 51*b* of the foils 51 are sandwiched between the end surface 32*a* of the second foil holder 32 and the ring-shaped fixing member 33. With this, the thrust bearing foil 50 is mounted to the second foil holder 32 (refer to FIG. 8B). Note that, the fixing portions 51*b* of the foils 51 may be bonded or welded to the end surface 31*d* of the flat plate portion 31*b* of the first foil holder 31, the end surface 32*a* of the second foil holder 32, or the ring-shaped fixing member 33.

Next, the sleeve portion 21 of the inner member 20 is inserted along an inner periphery of the radial bearing foil 40 mounted to the first foil holder 31. After that, the second foil holder 32 is mounted to the first foil holder 31 in a manner that the flange portion 22 of the inner member 20 is sandwiched from both axial sides. Specifically, the fixing member 33 mounted to the first foil holder 31 and the fixing member 33 mounted to the second foil holder 32 are held in abutment against each other, and in this state, both the foil holders 31 and 32 are fixed in the axial direction with bolts and the like (not shown). At this time, as illustrated in FIG. 3, a common positioning pin 34 is fitted into an axial hole formed through both the fixing members 33 so that both the fixing members 33 are positioned in a direction orthogonal to the axial direction, thereby positioning both the foil holders 31 and 32 in the direction orthogonal to the axial direction.

In this way, the foil bearing unit 100 is completed. In the foil bearing unit 100, the inner member 20 is received in the bearing case 30, and the first foil holder 31, the second foil holder 32, and the flange portion 22 are engaged with each other in the axial direction. With this, the inner member 20 may be retained in the bearing case 30. Thus, the foil bearing unit 100 may be handled integrally, and hence efficiency at the time of assembly into the housing 10 of the gas turbine may be enhanced.

In the configuration described above, when the rotary shaft 6 is rotated to one side in the circumferential direction (direction of the arrow in each of FIG. 5 and FIG. 8), an air film is formed in an radial bearing gap between a bearing surface 41*a* of the radial bearing foil 40 and the outer peripheral surface 21*a* of the sleeve portion 21 of the inner member 20, and a pressure of the air film allows the inner member 20 and the rotary shaft 6 to be supported in the radial direction. At the same time, air films are formed respectively in a thrust bearing gap between the bearing surface 51*e* of the thrust bearing foil 50 mounted to the first foil holder 31 and the one end surface 22*a* of the flange portion 22 of the inner member 20, and in a thrust bearing gap between the bearing surface 51*e* of the thrust bearing foil 50 mounted to the second foil holder 32 and the another end surface 22*b* of the flange portion 22 of the inner member 20. Pressures of the air films allow the inner member 20 and the rotary shaft 6 to be supported in both thrust directions.

Figure 11:
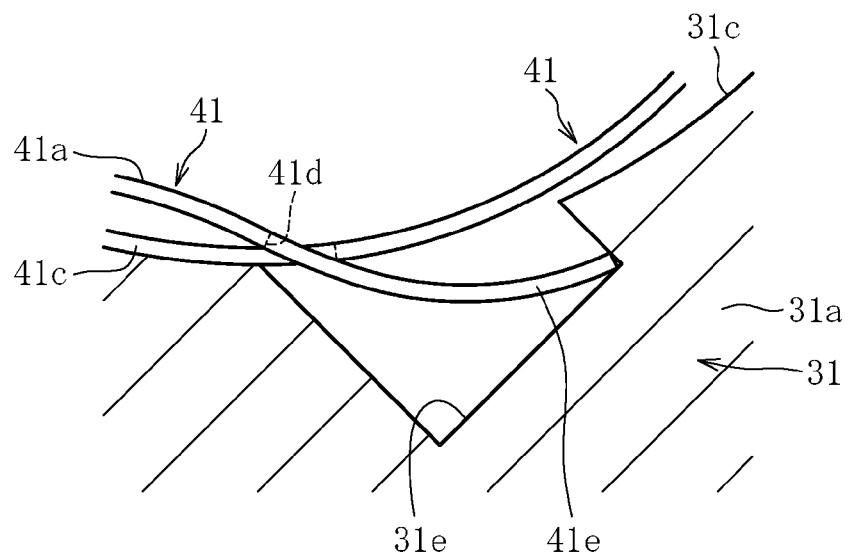
FIG. 11 is an enlarged view for illustrating the part C in FIG. 5.

Further, when the rotary shaft 6 is rotated, friction against the rotary shaft 6 and the viscosity of the air cause the foils 41 of the radial bearing foil 40 to be rotated to the downstream side in the rotation direction (direction of the arrow in FIG. 5). Then, end portions (projecting portions 41e) of the foils on the downstream side in the rotation direction strike against corner portions of the grooves 31e. With this, movement of the foils 41 is restricted. As a result, as illustrated in FIG. 11, the end portions (projecting portions 41e) of the foils 41 on the downstream side in the rotation direction are curved in the grooves 31e so that the bearing surface 41a is convexed radially inward. Then, when the pressure of the air film in the radial bearing gap is increased, the foils 41 of the radial bearing foil 40 are elastically deformed by being pressed radially outward. In this state, the shapes of the foils 41 are maintained at positions where elastic forces of the foils 41 and the pressure of the air film to be formed in the radial bearing gap are counterbalanced. Further, when the pressures of the air films in the thrust bearing gaps are increased along with the rotation of the rotary shaft 6, the foils 51 of the thrust bearing foils 50 are elastically deformed by being pressed toward the first foil holder 31 and the second foil holder 32 (refer to FIG. 9). The shapes of the foils 51 are maintained at positions where elastic forces of the foils 51 and the pressures of the air films to be formed in the thrust bearing gaps are counterbalanced.

At this time, due to flexibilities of the foils 41 and 51, the bearing surfaces 41a and 51e of the foils 41 and 51 are arbitrarily deformed in accordance with operating conditions such as a load, a rotation speed of the rotary shaft 6, and an ambient temperature. Thus, the radial bearing gap and the thrust bearing gaps are automatically adjusted so as to have appropriate widths in accordance with the operating conditions. As a result, even under severe conditions involving high temperature and high speed rotation, the radial bearing gap and the thrust bearing gaps may be managed so as to have optimum widths, and hence the inner member 20 and the rotary shaft 6 may be stably supported.

Further, when the radial bearing foil 40 and one of the thrust bearing foils 50 are mounted to the first foil holder 31 formed of a single component, a relative positional accuracy (such as perpendicularity) between mounting surfaces for the bearing foils 40 and 50 (the inner peripheral surface 31c of the cylindrical portion 31a and the end surface 31d of the flat plate portion 31b) may be enhanced. With this, a relative positional accuracy between the bearing surfaces 41a and 51e of the bearing foils 40 and 50 may be enhanced, thereby setting the radial bearing gap and the thrust bearing gaps with high accuracy. Thus, the inner member 20 and the rotary shaft 6 may be supported with high accuracy. In particular, in this embodiment, the sleeve portion 21 and the flange portion 22 of the inner member 20 are formed integrally with each other, and hence a relative positional accuracy between surfaces to face the bearing foils 40 and 50 mounted to the first foil holder 31 (the outer peripheral surface 21a of the sleeve portion 21 and the one end surface 22a of the flange portion 22) also may be enhanced. With this, accuracies of the radial bearing gap and the thrust bearing gaps may be further enhanced. Thus, supporting accuracies of the inner member 20 and the rotary shaft 6 may be further enhanced.

Further, in this embodiment, the fixing members 33 and 33 are arranged axially between the first foil holder 31 and the second foil holder 32. In this case, the fixing members 33 and 33 function as spacers that determine an axial distance between the end surface 31d of the first foil holder 31 and the end surface 32a of the second foil holder 32 so that the axial distance there between is set with high accuracy. With this, the thrust bearing gap between the end surface 31d of the first foil holder 31 and the one end surface 22a of the flange portion 22 of the inner member 20, and the thrust bearing gap between the end surface 32a of the second foil holder 32 and the another end surface 22b of the flange portion 22 of the inner member 20 may be set with high accuracy. As a result, a supporting accuracy of the rotary shaft 6 in the thrust directions may be further enhanced. Note that, although each of the first foil holder 31 and the second foil holder 32 comprises the fixing member 33 in this embodiment, when the fixing portions 51b of the foils 51 are joined integrally to the end surface 31d of the flat plate portion 31b of the first foil holder 31 and the end surface 32a of the second foil holder 32 through welding or other methods, a single fixing member 33 may be arranged. In that case, the thrust bearing gaps may be set only with an axial dimension of the single fixing member 33.

Note that, during low speed rotation immediately before stop or immediately after actuation of the rotary shaft 6, the bearing surfaces 41a and 51e of the foils 41 and 51 and the inner member 20 come into sliding contact with each other. Thus, low-friction coating such as a DLC film, a titanium aluminum nitride film, and a molybdenum disulfide film may be formed on one or both of the bearing surfaces 41a and 51e and the inner member 20. Further, during operation of the bearing, slight sliding occurs between the foils 41 and 51 and each of the foil holders 31 and 32. As a countermeasure, the low-friction coating as described above may be formed on one or both of the foils 41 and 51 and the foil holders 31 and 32.

Figure 12:
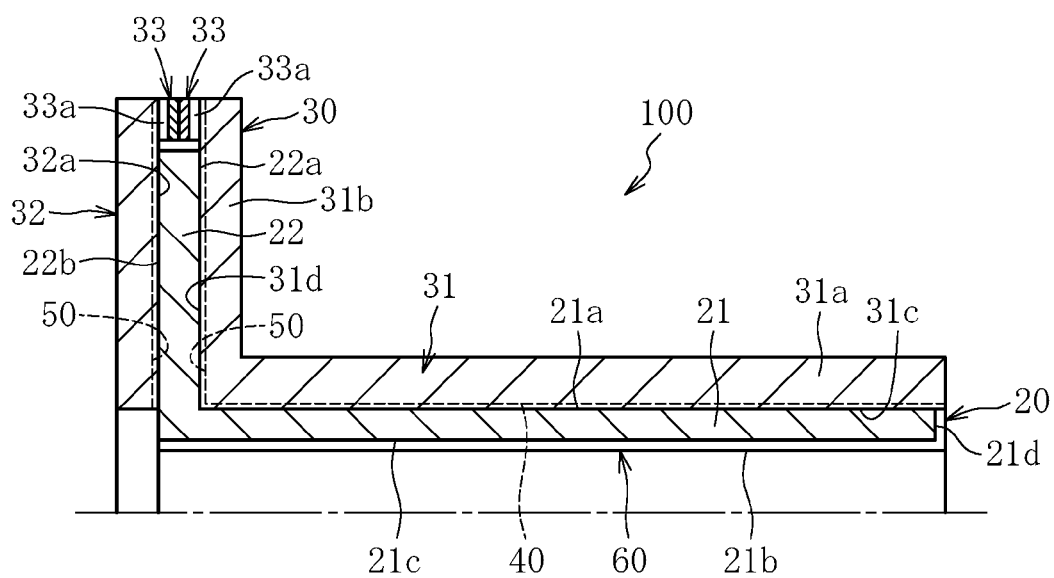
FIG. 12 is a sectional view for illustrating a foil bearing unit according to another embodiment of the first invention of the present application.

The present invention is not limited to the embodiment described above. In an embodiment of the present invention, which is illustrated in FIG. 12, a radial communication hole 33a is formed through each of the fixing members 33. With this, along with the rotation of the rotary shaft 6 and the inner member 20, air in the thrust bearing gaps is caused to flow radially outward by a centrifugal force, and is exhausted to an outside through the communication holes 33a. At this time, when the air in the thrust bearing gap between the first foil holder 31 and the flange portion 22 is exhausted to the outside through the communication hole 33a, air in the radial bearing gap communicating thereto is exhausted to the outside through the communication hole 33a via the thrust bearing gap. In the foil bearing unit 100, a temperature is increased on the turbine 1 side. Thus, when the air in the radial bearing gap near the turbine 1 is exhausted to the outside, air in the bearing case 30 may be cooled.

Further, in this embodiment, a communication path 60 configured to communicate an end portion of the radial bearing gap on the turbine side and a space in the foil bearing unit 100 on the compressor 2 side to each other is formed. Specifically, an axial groove 21c is formed in the inner peripheral surface 21b of the inner member 20, and a radial groove 21d is formed in an end surface of the inner member 20 on the turbine 1 side. The communication path 60 is formed of the axial groove 21c and the radial groove 21d. With this, when the air in the thrust bearings gaps is exhausted to the outside through the communication holes 33a along with the rotation of the rotary shaft 6, the air on the compressor 2 side is introduced via the end portion of the radial bearing gap on the turbine 1 side through the communication path 60. A temperature of the air on the compressor 2 side is significantly lower than that of air on the turbine 1 side. Thus, when the air on the compressor 2 side is introduced into the radial bearing gap, the foil bearing unit 100 may be efficiently cooled.

Figure 13:
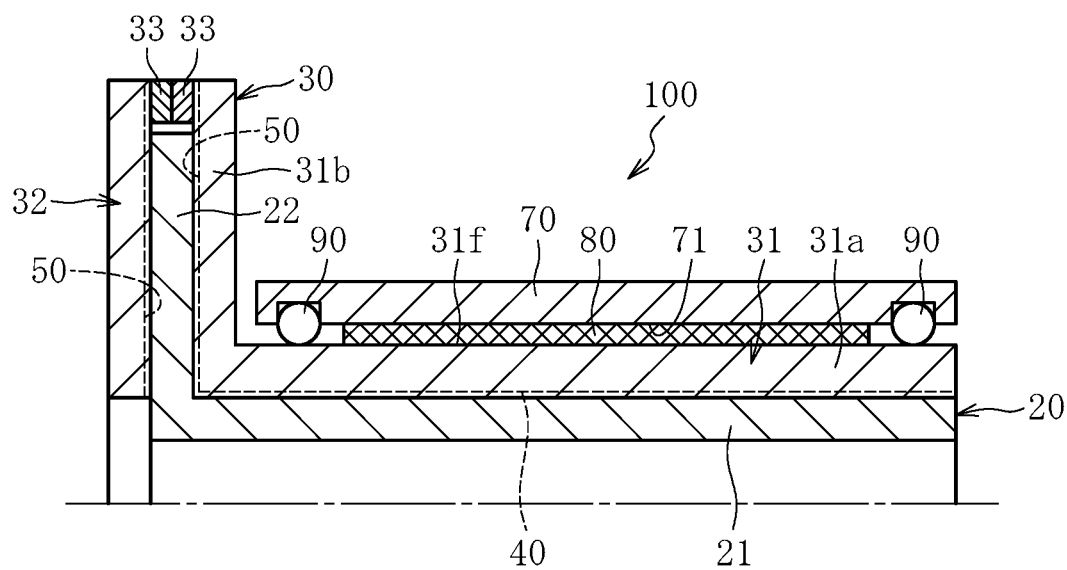
FIG. 13 is a sectional view for illustrating a foil bearing unit according to still another embodiment of the first invention of the present application.

In an embodiment of the present invention, which is illustrated in FIG. 13, a mounting member 70 is arranged on an outer periphery of the bearing case 30, and the mounting member 70 and the bearing case 30 are coupled to each other through intermediation of a damper 80. An outer peripheral surface of the mounting member 70 is mounted to the housing 10 of the gas turbine. In the illustrated example, the mounting member 70 is formed into a cylindrical shape so that an inner peripheral surface 71 of the mounting member 70 and an outer peripheral surface 31f of the bearing case 30 are coupled to each other through intermediation of the damper 80. As the damper 80, there may be used, for example, a wire mesh, a high viscosity oil, a resin, and rubber. O-rings 90 are arranged between the mounting member 70 and the bearing case 30. The O-rings 90 restrict radial movement of the bearing case 30 relative to the mounting member 70. The damper 80 is deformed so that the bearing case 30 is allowed to move in the circumferential direction and the axial direction relative to the mounting member 70. With this, when the bearing case 30 vibrates, the damper 80 is deformed and absorbs the vibration of the bearing case 30. In this way, the vibration may be damped.

Figure 14:
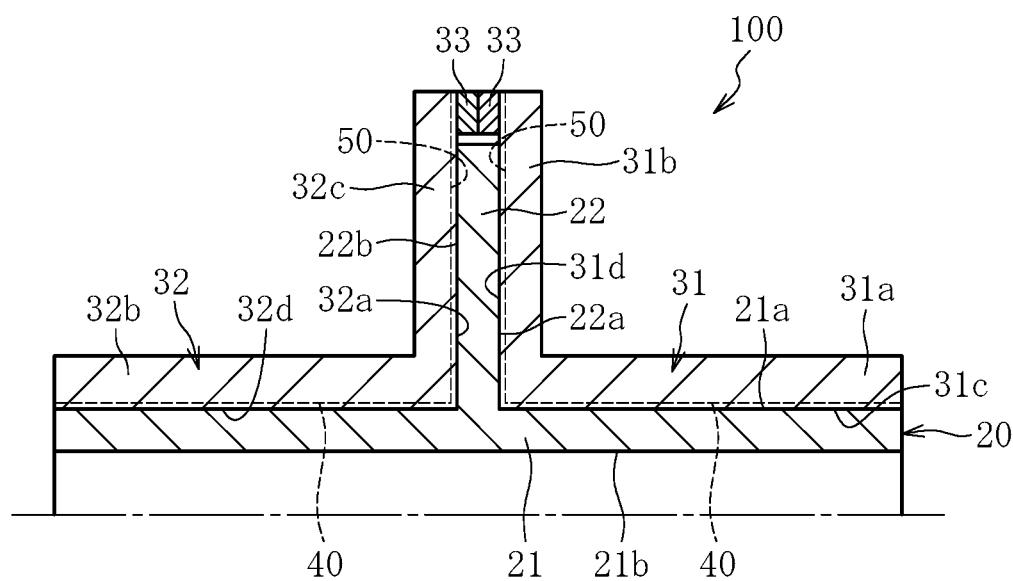
FIG. 14 is a sectional view for illustrating a foil bearing unit according to yet another embodiment of the first invention of the present application.

In an embodiment of the present invention, which is illustrated in FIG. 14, the flange portion 22 is arranged at an axial intermediate portion (axial central portion in the illustrated example) of the sleeve portion 21 of the inner member 20, and the second foil holder 32 integrally comprises a cylindrical portion 32b and a disc-like flat portion 32c. A radial bearing foil 40 is mounted to an inner peripheral surface 32d of the cylindrical portion 32b of the second foil holder 32. With this, the radial bearing gap is formed on each axial side with respect to the flange portion 22, and hence supportability may be enhanced in spite of a moment force generated by centrifugal whirling of the rotary shaft 6. In particular, when the flange portion 22 is increased in diameter (specifically, when the flange portion 22 has a diameter larger than an axial length of the sleeve portion 21), the moment force is increased. In this case, the configuration of this embodiment is advantageous.

In the embodiments described above, the radial bearing foil 40 comprises a multi-arc bearing. However, the present invention is not limited thereto, and there may be used a radial bearing foil of what is called a leaf type in which the one circumferential end of each of the foils is mounted to the inner peripheral surface of the bearing case 30, and the another circumferential end of each of the foils is formed as a free end, or a radial bearing foil of what is called a bump foil type in which a corrugated back foil is arranged on a radially outside of a cylindrical top foil.

Further, in the embodiments described above, the fixing portions 51b arranged at radially outer ends of the foils 51 of the thrust bearing foils 50 are fixed to the bearing case 30. However, the present invention is not limited thereto, and one circumferential end of each of the foils 51 may be mounted to the bearing case 30, and another circumferential end thereof may be formed as a free end.

Figure 15:
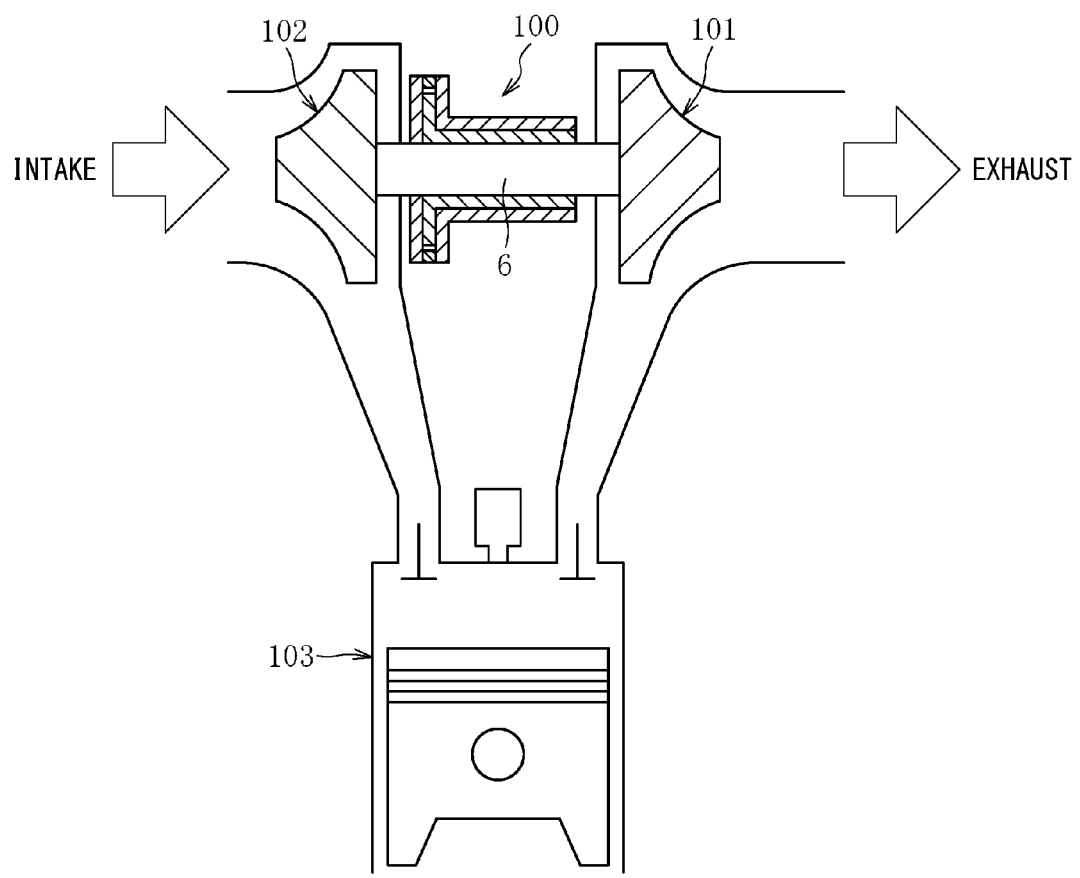
FIG. 15 is a schematic side view for illustrating a configuration of a supercharger.

The foil bearing unit 100 according to the present invention is applicable not only to the gas turbine described above, and may be used as a bearing for supporting a rotor of a supercharger, for example. As illustrated in FIG. 15, in the supercharger, a turbine 101 is driven with an exhaust gas generated in an engine 103, and a compressor 102 is rotated by a drive force thus generated, to thereby compress intake air. This configuration enables the engine 103 to generate higher torque and have higher efficiency. The turbine 101, the compressor 102, and the rotary shaft 6 serve as a rotor, and the foil bearing unit 100 of each of the embodiments described above may be used as the bearing for supporting the rotary shaft 6.

The foil bearing according to the present invention may be used not only as turbo-machines such as the gas turbine and the supercharger, but widely used also as bearings for vehicles such as an automobile, which are used under restrictions such as a difficulty in lubricating with a liquid such as a lubricating oil, a difficulty in separately arranging an auxiliary device of a lubricating oil circulatory system in view of energy efficiency, or problems that may be caused by shearing resistance of the liquid. The foil bearing according to the present invention may be widely used also as bearings for industrial devices.

Further, the foil bearings described above are each an air dynamic pressure bearing that uses air as a pressure generating fluid. However, the present invention is not limited thereto, and other gases or liquids such as water and oil may be used as the pressure generating fluid.

Now, description is made of embodiments of a second invention of the present application with reference to FIG. 16 to FIG. 24.

Figure 16:
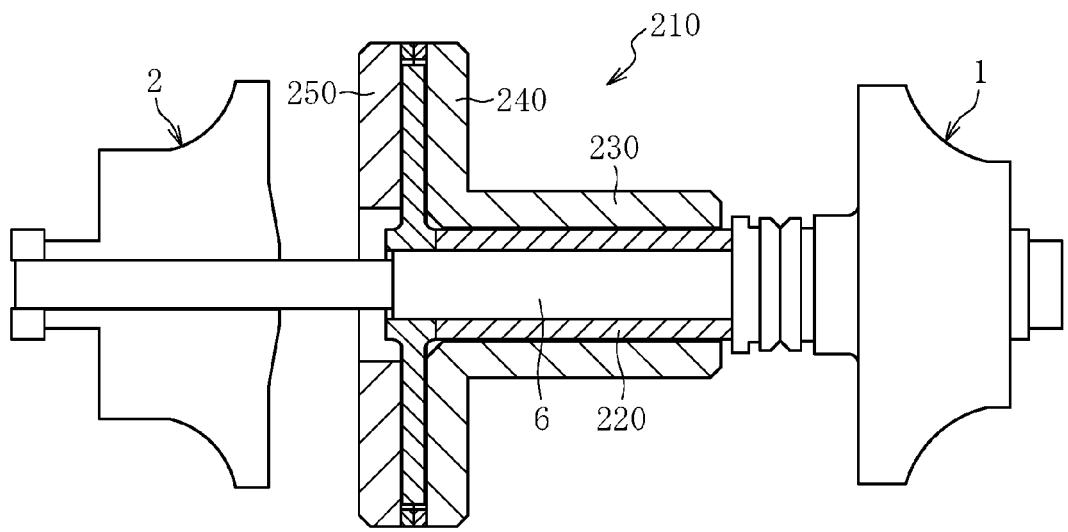
FIG. 16 is a sectional view for illustrating a support structure for a rotor of the gas turbine.

FIG. 16 is an illustration of a foil bearing unit 210 configured to support the shaft (rotary shaft) 6 of the rotor of the gas turbine illustrated in FIG. 1. The foil bearing unit 210 comprises a rotary member 220 fixed to the shaft 6, a radial foil bearing 230 for supporting the shaft 6 and the rotary member 220 in the radial direction, and a first thrust foil bearing 240 and a second thrust foil bearing 250 for supporting the shaft 6 and the rotary member 220 in the thrust directions.

Figure 17:
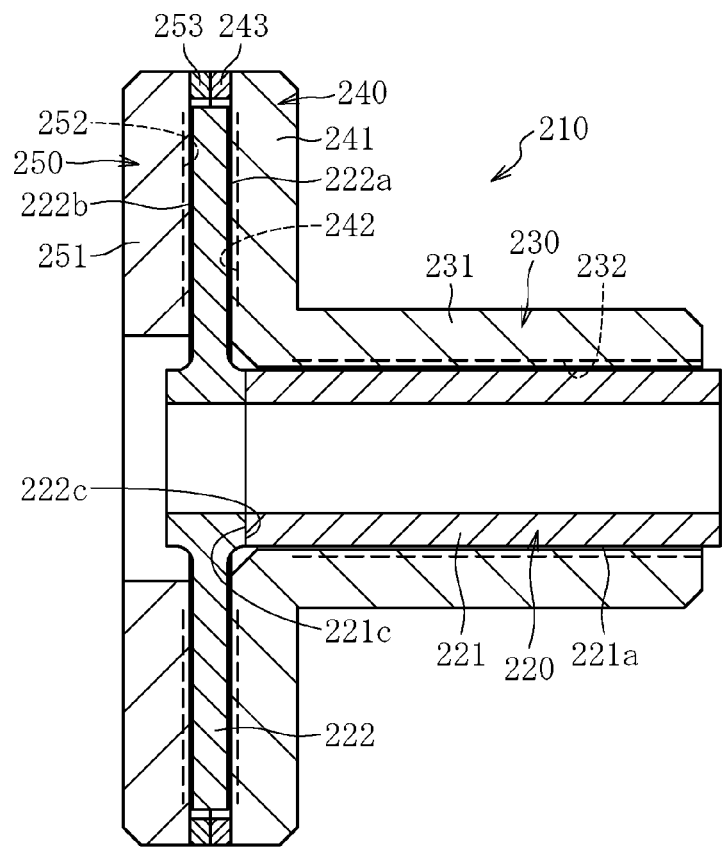
FIG. 17 is a sectional view for illustrating a foil bearing unit according to an embodiment of a second invention of the present application, which is assembled in the support structure.

As illustrated in FIG. 17, the rotary member 220 comprises a sleeve portion 221, and a disc-like flange portion 222 projecting radially outward from the sleeve portion 221. In the illustrated example, the flange portion 222 is arranged at an axial end portion of the sleeve portion 221 on the compressor 2 side (left side in FIG. 17). At least a part of the rotary member 220 is made of a carbon fiber reinforced composite. In this embodiment, the sleeve portion 221 and the flange portion 222 of the rotary member 220 are formed separately from each other, and are formed of materials different from each other. The flange portion 222 is made of the carbon fiber reinforced composite, specifically, a composite of a carbon fiber and a carbon matrix, or a composite of the carbon fiber and a graphite matrix (C/C composite). The C/C composite is formed by an impregnation method involving impregnating a base material made of a carbon fiber with a matrix such as a resin, and then baking and carbonizing the matrix (graphitizing the matrix when necessary), or a CVD method involving depositing carbon, which is obtained through thermal decomposition of hydrocarbons, onto a carbon fiber base material. The sleeve portion 221 is made, for example, of a sintered material, and in this embodiment, is made of a sintered carbon material obtained through baking carbon powder (specifically, graphite powder).

The sleeve portion 221 and the flange portion 222 are integrated while being held in abutment against each other in the axial direction. Specifically, the sleeve portion 221 and the flange portion 222 are fixed to each other by an appropriate measure such as welding and bonding under a state in which an end surface 221c of the sleeve portion 221 and an end surface 222c formed along a radially inner end of the flange portion 222 are held in abutment against each other in the axial direction. The rotary member 220 thus integrated is fitted and fixed, specifically, fixed through press fitting to the outer peripheral surface of the shaft 6. When the sleeve portion 221 and the flange portion 222 are integrated with each other in advance in this way, the sleeve portion 221 and the flange portion 222 may be assembled to the shaft 6 under a state in which a relative position (perpendicularity, coaxiality, and the like) between the sleeve portion 221 and the flange portion 222 is set with high accuracy.

Figure 18:
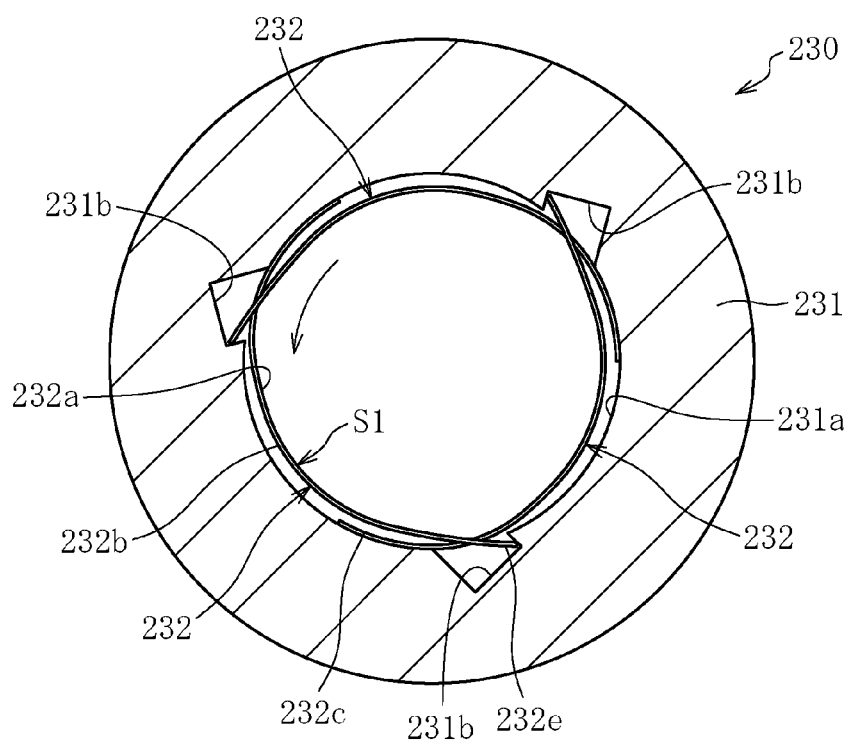
FIG. 18 is a sectional view for illustrating a radial foil bearing that is assembled in the foil bearing unit.

As illustrated in FIG. 18, the radial foil bearing 230 comprises a cylindrical foil holder 231, and a plurality of foils 232 mounted to an inner peripheral surface of the foil holder 231. Grooves 231b for allowing circumferential end portions of the foils 232 to be inserted thereinto are formed in the inner peripheral surface 231a of the foil holder 231. The grooves 231b, which extend over an entire axial length of the foil holder 231, are formed at a plurality of equiangular positions (three positions in the illustrated example).

The plurality of foils 232 are mounted to the inner peripheral surface 231a of the foil holder 231 under a circumferentially arrayed state. Radially inner surfaces 232a of the foils 232 function as a radial bearing surface S1. In the illustrated example, the three foils 232 form a multi-arc radial bearing surface S1. The members (such as back foils) configured to impart elasticity to the foils 232 are not arranged between the inner peripheral surface 231a of the foil holder 231 and the foils 232 so that a radially outer surface 232b of each of the foils 232 and the inner peripheral surface 231a of the foil holder 231 are slidable relative to each other.

Figure 19A:
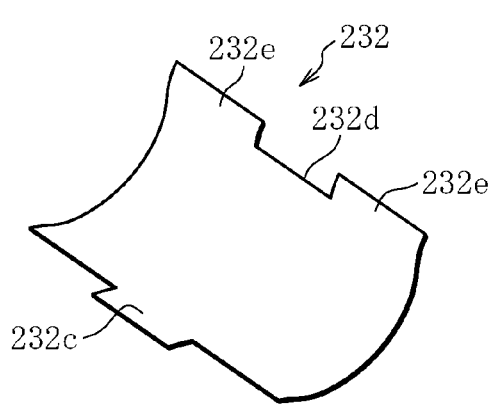
FIG. 19A is a perspective view for illustrating a foil of the radial foil bearing.
Figure 19B:
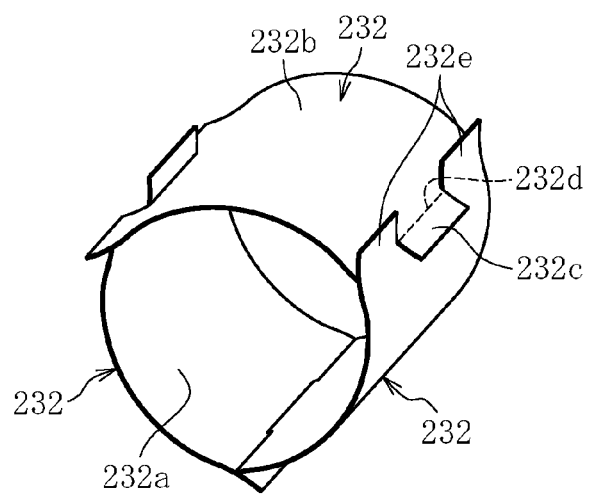
FIG. 19B is a perspective view for illustrating a state in which three foils are temporarily assembled.

As illustrated in FIG. 19A, each of the foils 232 comprises a projecting portion 232c formed at one circumferential end, and a recessed portion 232d formed at another circumferential end. The projecting portion 232c and the recessed portion 232d of each of the foils 232 are formed at the same position in the axial direction. As illustrated in FIG. 19B, the projecting portion 232c of each of the foils 232 may be fitted to the recessed portion 232d of adjacent one of the foils 232, thereby temporarily assembling the three foils 232 into a cylindrical shape. In this case, in the axial view illustrated in FIG. 18, the one circumferential end (projecting portion 232c) of each of the foils 232 and the another circumferential end (projecting portions 232e on both axial sides of the recessed portion 232d) of the adjacent one of the foils 232 are intersected with each other. In this embodiment, the projecting portions 232e at the another circumferential end of each of the foils 232 are inserted into each of the grooves 231b formed in the inner peripheral surface 231a of the foil holder 231. The projecting portion 232c at the one circumferential end of each of the foils 232 is arranged between the radially outer surface 232b of adjacent one of the foils 232 and the inner peripheral surface 231a of the foil holder 231 so as to function as an underfoil portion.

As illustrated in FIG. 17, the first thrust foil bearing 240 is configured to support the flange portion 222 of the rotary member 220 from one axial side (right side in FIG. 17), and comprises a disc-like foil holder 241, and a plurality of foils 242 fixed to an end surface 241a of the foil holder 241. In this embodiment, the foil holder 241 of the first thrust foil bearing 240 and the foil holder 231 of the radial foil bearing 230 are formed integrally with each other, and serve as the first foil holder.

Figure 20:
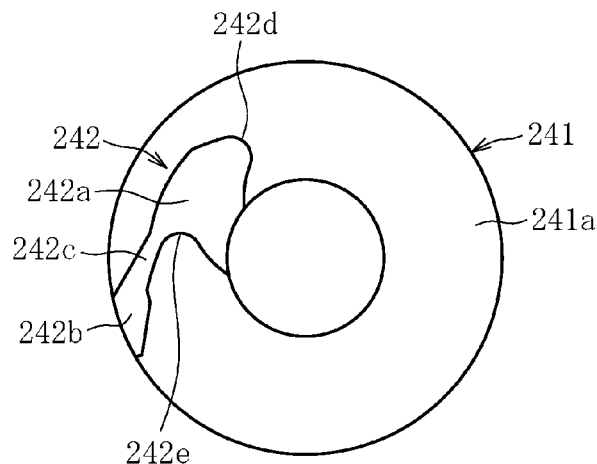
FIG. 20 is a plan view for illustrating a foil and a foil holder of a thrust foil bearing.

As illustrated in FIG. 20, each of the foils 242 of the first thrust foil bearing 240 integrally comprises a body portion 242a, a fixing portion 242b arranged on a radially outer side with respect to the body portion 242a, and a coupling portion 242c configured to couple the body portion 242a and the fixing portion 242b to each other. An edge 242d of the body portion 242a on the downstream side in the rotation direction (rotation direction of the shaft 6, the same hereinafter), and an edge 242e of the body portion 242a on the upstream side in the rotation direction each comprise a central portion that is formed into a substantially V-shape projecting to the downstream side in the rotation direction. The central portion of each of the edges 242d and 242e of the body portion 242a is rounded into a circular-arc shape.

Figure 21A:
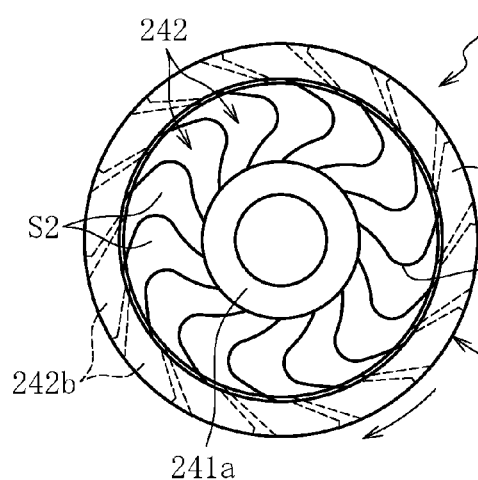
FIG. 21A is a plan view for illustrating a first thrust foil bearing.
Figure 22:
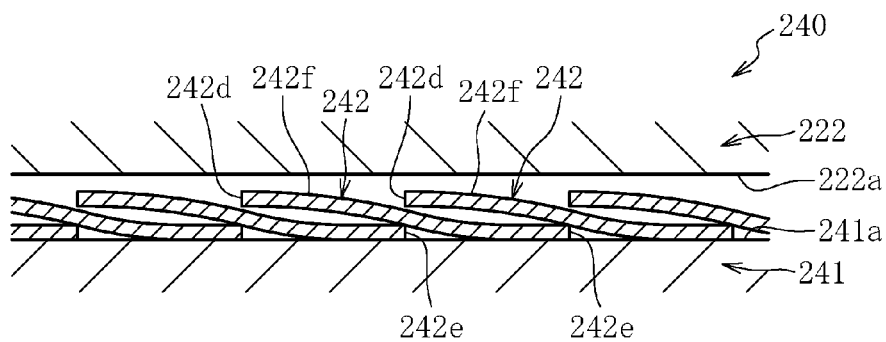
FIG. 22 is a sectional view for illustrating the first thrust foil bearing.
Figure 23:
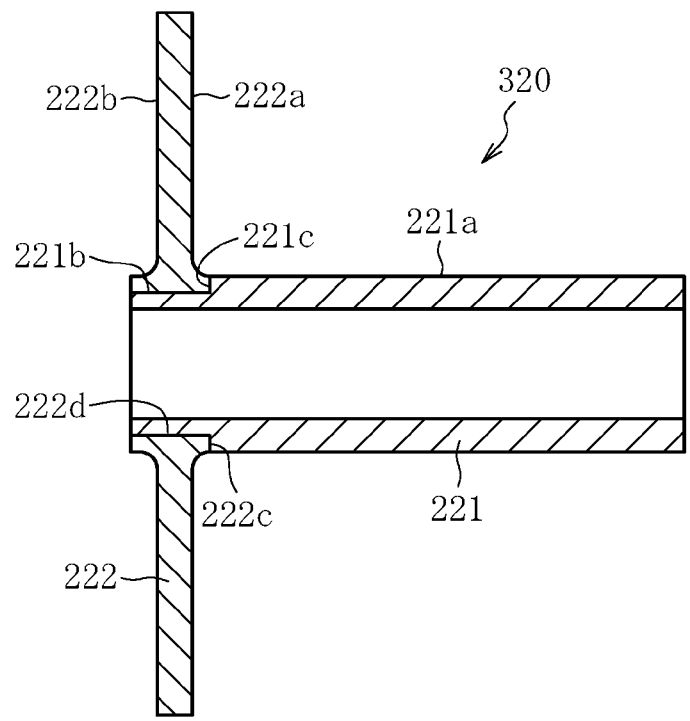
FIG. 23 is a sectional view for illustrating another example of a rotary member.

As illustrated in FIG. 21A, the fixing portions 242b of the foils 242 are fixed to a radially outer rim of the end surface 241a of the foil holder 241. In the illustrated example, the fixing portions 242b of the plurality of foils 242 are arranged on the same circumference, and entire regions of the fixing portions 242b are fixed by being sandwiched between a ring-shaped fixing member 243 and the end surface 241a of the foil holder 241. The plurality of foils 242 are arranged at a circumferentially constant pitch. In the illustrated example, the foils 242 are overlapped with each other in a phase shifted by an amount corresponding to half of the foils 242. As illustrated in FIG. 22, each of the edges 242d of the foils 242 on the downstream side in the rotation direction is arranged on adjacent one of the foils 242 (on the flange portion 222 side). In other words, downstream portions of the foils 242 in the rotation direction overrides on upstream portions of adjacent ones of the foils 242 in the rotation direction. Parts of surfaces of the body portions 242a of the foils 242, which directly face one end surface 222a of the flange portion 222 (parts illustrated in FIG. 21A), function as a thrust bearing surface S2. Note that, the fixing portions 242b of the foils 242 may be fixed to the foil holder 241 or the fixing member 243 through welding, bonding, or the like.

Figure 21B:
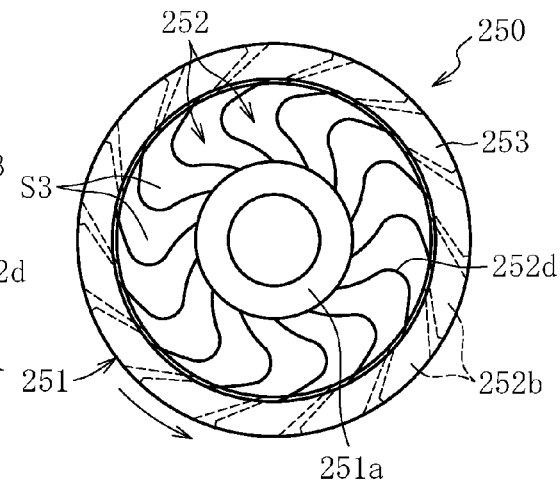
FIG. 21B is a plan view for illustrating a second thrust foil bearing.

As illustrated in FIG. 17, the second thrust foil bearing 250 is configured to support the flange portion 222 of the rotary member 220 from another axial side (left side in FIG. 17). As illustrated in FIG. 21B, the second thrust foil bearing 250 comprises a disc-like foil holder 251 (second foil holder), and a plurality of foils 252 fixed to an end surface 251a of the foil holder 251. Parts of surfaces of body portions of the foils 252, which directly face another end surface 222b of the flange portion 222 (parts illustrated in FIG. 21B), function as a thrust bearing surface S3. Other features of the second thrust foil bearing 250 are the same as those of the first thrust foil bearing 240, and hence redundant description thereof is omitted.

Each of the foils 232, 242, and 252 is formed through press working, wire cutting, etching, or the like on a metal foil made of a metal that is excellent in resiliency and processability, such as a steel material or a copper alloy, and having a thickness of from approximately 20 μm to approximately 200 μm. As in this embodiment, in the air dynamic pressure bearing that uses air as a fluid film, a lubricating oil does not exist in an atmosphere. Thus, it is preferred that the metal foil be made of stainless steel or bronze.

The foil bearing unit 210 having the configuration described above is assembled by the procedure as described below. First, the sleeve portion 221 of the rotary member 220 is inserted along an inner periphery of the radial foil bearing 230. After that, the second thrust foil bearing 250 is mounted to the first thrust foil bearing 240 so that the flange portion 222 of the rotary member 220 is sandwiched from both the axial sides. Specifically, the fixing member 243 mounted to the foil holder 241 of the first thrust foil bearing 240 and a fixing member 253 mounted to the foil holder 251 of the second thrust foil bearing 250 are held in abutment against each other in the axial direction, and in this state, both the foil holders 241 and 251 are fixed with bolts or the like (not shown). In this way, the foil bearing unit 210 is completed.

The shaft 6 is press-fitted to an inner periphery of the rotary member 220, and a part or an entirety of each of the foil holders 231, 241, and 251 of the foil bearings 230, 240, and 250 is fixed to the housing of the gas turbine. With this, the foil bearing unit 210 having the configuration described above is assembled into the gas turbine. At this time, the sleeve portion 221 and the flange portion 222 of the rotary member 220 are integrated with each other in advance. Thus, the rotary member 220 may be mounted to the shaft 6 under a state in which a relative position therebetween, specifically, a perpendicularity and the like between an outer peripheral surface 221a of the sleeve portion 221 and both the end surfaces 222a and 222b of the flange portion 222 are set with high accuracy. Further, in the foil bearing unit 210, the rotary member 220 is received in a bearing member comprising the radial foil bearing 230 and the thrust foil bearings 240 and 250, and the bearing member and the rotary member 220 are integrated with each other with the separation therebetween being restricted. Thus, the bearing member and the rotary member 220 may be handled integrally at the time of assembly into the gas turbine, and hence assembly efficiency may be enhanced.

When the shaft 6 is rotated to one side in the circumferential direction (direction of the arrow in each of FIG. 18 and FIG. 21), a radial bearing gap is formed between the radial bearing surface S1 of the foils 232 of the radial foil bearing 230 and the outer peripheral surface 221a of the sleeve portion 221 of the rotary member 220, and a pressure of an air film formed in the radial bearing gap allows the rotary member 220 and the shaft 6 to be supported in the radial direction. At the same time, thrust bearing gaps are formed respectively between the thrust bearing surface S2 of the foils 242 of the first thrust foil bearing 240 and the one end surface 222a of the flange portion 222 of the rotary member 220, and between the thrust bearing surface S3 of the foils 252 of the second thrust foil bearing 250 and the another end surface 222b of the flange portion 222 of the rotary member 220. Pressures of air films formed in the thrust bearing gaps allow the rotary member 220 and the shaft 6 to be supported in both the thrust directions.

At this time, due to flexibilities of the foils 232, 242, and 252, the bearing surfaces S1, S2, and S3 of the foils 232, 242, and 252 are arbitrarily deformed in accordance with the operating conditions such as a load, the rotation speed of the shaft 6, and an ambient temperature. Thus, the radial bearing gap and the thrust bearing gaps are automatically adjusted so as to have appropriate widths in accordance with the operating conditions. As a result, even under the severe conditions involving high temperature and high speed rotation, the radial bearing gap and the thrust bearing gaps may be managed so as to have optimum widths, and hence the rotary member 220 and the shaft 6 may be stably supported.

Further, when the flange portion 222 of the rotary member 220 is made of the carbon fiber reinforced composite as described above, the flange portion 222 is reduced in weight and increased in tensile strength. As a result, the rotary member 220 is increased in rotational responsiveness and centrifugal strength. In particular, when the flange portion 222 has a relatively large diameter (specifically, as illustrated in FIG. 17, when the flange portion 222 has a diameter larger than an axial dimension of the sleeve portion 221), the formation of the flange portion 222 with the carbon fiber reinforced composite as described above is advantageous. In particular, when the flange portion 222 is made of the C/C composite, heat resistance is enhanced. In addition, due to lubricity of the carbon (graphite) as a matrix of the flange portion 222, slidability relative to the thrust foil bearings 240 and 250 may be enhanced.

In addition, when the sleeve portion 221 of the rotary member 220 is made of the sintered carbon material, slidability relative to the radial foil bearing 230 may be enhanced. In particular, as in this embodiment, when the rotary member 220 is fixed to the shaft 6 extending in a horizontal direction, during low speed rotation at the time of the actuation or the stop of the shaft 6, the outer peripheral surface 221a of the sleeve portion 221 comes into contact with the foils 232 of the radial foil bearing 230. In this case, the formation of the sleeve portion 221 with the sintered carbon material is advantageous in view of enhancing the slidability.

Note that, during the low speed rotation immediately before the stop or immediately after the actuation of the shaft 6, the bearing surfaces S1 to S3 of the foils and the rotary member 220 come into sliding contact with each other. Thus, the low-friction coating such as a DLC film, a titanium aluminum nitride film, and a molybdenum disulfide film may be formed on one or both of the bearing surfaces S1 to S3 of the foils and the rotary member 220. Further, during the rotation of the shaft 6, slight sliding occurs between the foils 232, 242, and 252 and the foil holders 231, 241, and 251. With this, vibration of the shaft 6 may be suppressed. In order to adjust a frictional force that is generated by the slight sliding, the low-friction coating as described above may be formed on one or both of the foils 232, 242, and 252 and the foil holders 231, 241, and 251.

The present invention is not limited to the embodiments described above. For example, in a rotary member 320 illustrated in FIG. 23, the flange portion 222 and the sleeve portion 221 are integrated under a state in which the flange portion 222 and the sleeve portion 221 are held in abutment against each other in the axial direction, and also an inner peripheral surface of the flange portion 222 and the outer peripheral surface of the sleeve portion 221 are fitted to each other. More specifically, a small-diameter outer peripheral surface 221b is formed on one axial end side of the outer peripheral surface 221a of the sleeve portion 221 so that the small-diameter outer peripheral surface 221b of the sleeve portion 221 is fitted to an inner peripheral surface 222d of the flange portion 222. In addition, a shoulder surface (end surface 221c) between the outer peripheral surface 221a of the sleeve portion 221 and the small-diameter outer peripheral surface 221b, and the end surface 222c of the flange portion 222 are held in abutment against each other.

When the end surface 221c of the sleeve portion 221 and the end surface 222c of the flange portion 222 are held in abutment against each other, and the small-diameter outer peripheral surface 221b of the sleeve portion 221 and the inner peripheral surface 222d of the flange portion 222 are fitted to each other in this way, a relative positional accuracy therebetween is further enhanced. In addition, the contact area between the sleeve portion 221 and the flange portion 222 is increased, and hence a coupling force therebetween is increased. In particular, in this embodiment, a region of the small-diameter outer peripheral surface 221b is smaller in radial thickness than other regions in the sleeve portion 221. Thus, along with press-fitting to the shaft 6, the small-diameter outer peripheral surface 221b is radially expanded and pressed against the inner peripheral surface 222d of the flange portion 222. With this, the coupling force between the sleeve portion 221 and the flange portion 222 is further increased.

Figure 24:
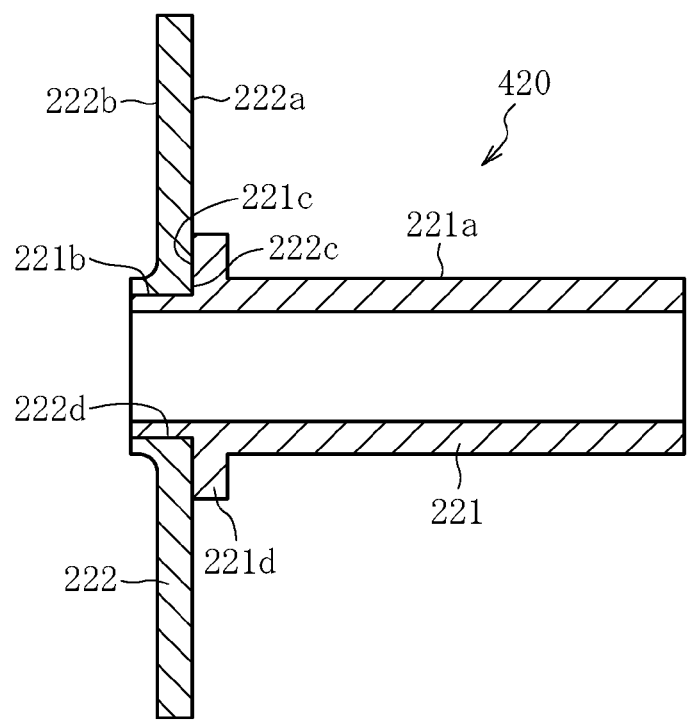
FIG. 24 is a sectional view for illustrating still another example of the rotary member.

In a rotary member 420 illustrated in FIG. 24, a projecting portion 221d projecting radially outward is formed between the outer peripheral surface 221a and the small-diameter outer peripheral surface 221b of the sleeve portion 221. The end surface 221c of the projecting portion 221d is held in abutment against the end surface 222c of the radially inner end of the flange portion 222. With this, the contact area of the abutment portion between the sleeve portion 221 and the flange portion 222 is increased in the axial direction, and the relative positional accuracy and the coupling force there between may be further increased. Note that, the projecting portion 221d may be formed over an entire periphery of the sleeve portion 221, or may be formed at a plurality of positions spaced apart from each other in the circumferential direction.

Further, in the embodiment described above, the description is made of the case where the sleeve portion 221 of the rotary member 220 is made of the sintered carbon material, and the flange portion 222 is made of the carbon fiber reinforced composite. However, the present invention is not limited thereto, and other parts may be made of the carbon fiber reinforced composite depending on required characteristics. For example, when the shaft 6 is arranged in a vertical direction (not shown), during the low speed rotation at the time of, for example, the actuation or the stop of the shaft, the end surface 222b (or the end surface 222a) of the flange portion 222 and the thrust foil bearing 250 (or the thrust foil bearing 240) come into sliding contact with each other. Meanwhile, a frequency of contact between the outer peripheral surface 221a of the sleeve portion 221 and the radial foil bearing 230 is relatively low. Thus, when the rotary member 220 is fixed to the vertical shaft 6, the flange portion may be made of the sintered carbon material excellent in slidability, and the sleeve portion 221 may be made of the carbon fiber reinforced composite.

Further, in the embodiment described above, the sleeve portion 221 and the flange portion 222 of the rotary member 220 are formed separately from each other. However, the sleeve portion 221 and the flange portion 222 of the rotary member 220 may be integrally made of the carbon fiber reinforced composite.

Further, in the embodiment described above, the description is made of the case where the radial foil bearing 230 comprises a multi-arc bearing. However, the present invention is not limited thereto, and there may be used a radial bearing foil of what is called the leaf type in which the one circumferential end of each of the foils is mounted to the inner peripheral surface 231a of the foil holder 231, and the another circumferential end of each of the foils is formed as a free end, or a radial bearing foil of what is called the bump foil type in which a corrugated back foil is arranged on a radially outside of a cylindrical top foil. In addition, the configurations of the thrust foil bearings are not limited to those described above, and there may be used, for example, thrust foil bearings of the bump foil type in which the corrugated back foil is arranged between the top foil and the foil holder.

The foil bearing unit 210 according to the present invention is applicable not only to the gas turbine described above, and may be used as a bearing for supporting a rotor of a supercharger, for example. Further, the foil bearing according to the present invention may be used not only as turbo-machines such as the gas turbine and the supercharger, but widely used also as bearings for vehicles such as an automobile, which are used under restrictions such as a difficulty in lubricating with a liquid such as a lubricating oil, a difficulty in separately arranging an auxiliary device of a lubricating oil circulatory system in view of energy efficiency, or problems that may be caused by shearing resistance of the liquid. The foil bearing according to the present invention may be widely used also as bearings for industrial devices.

Further, the foil bearings described above are each an air dynamic pressure bearing that uses air as a pressure generating fluid. However, the present invention is not limited thereto, and other gases or liquids such as water and oil may be used as the pressure generating fluid.

Further, in the embodiments of the first invention and the second invention of the present application, the description is made of the case where each of the grooves 31e and 231b formed in the inner peripheral surfaces 31c and 231a of the foil holders 31 and 231 has an opening portion that is relatively large in circumferential width. However, the present invention is not limited thereto. For example, slit-like grooves each having an opening portion that is small in circumferential width may be formed in the inner peripheral surfaces of the foil holders, and the end portions of the foils may be inserted into those grooves.

In addition, the configurations according to the embodiments of the first invention of the present application and the configurations according to the embodiment of the second invention of the present application may be combined as appropriate with each other.

REFERENCE SIGNS LIST 1 turbine
2 compressor
6 rotary shaft
10 housing
20 inner member
21 sleeve portion
22 flange portion
30 bearing case
31 first foil holder
32 second foil holder
33 fixing member
40 radial bearing foil
41 foil
50 thrust bearing foil
51 foil
60 communication path
70 mounting member
80 damper
100 foil bearing unit

The invention claimed is:
1. A foil bearing unit, comprising:
a first foil holder formed of a single component;
a second foil holder mounted to the first foil holder;
a spacer arranged axially between the first foil holder and the second foil holder;
a radial bearing foil mounted to an inner peripheral surface of the first foil holder;
a thrust bearing foil mounted to an end surface of the first foil holder;
another thrust bearing foil mounted to an end surface of the second foil holder; and
an inner member, wherein
the inner member comprises:
a shaft portion to be inserted along an inner periphery of the first foil holder, the shaft portion comprising a hollow sleeve portion and a rotary shaft that is fixed to an inner peripheral surface of the hollow sleeve portion; and a flange portion projecting radially outward from the shaft portion, the inner member is supported in a radial direction by a fluid pressure that is generated in a radial bearing gap between a bearing surface of the radial bearing foil and an outer peripheral surface of the shaft portion, the inner member is further supported in a thrust direction by a fluid pressure that is generated in a thrust bearing gap between a bearing surface of the thrust bearing foil and one end surface of the flange portion, the inner member is additionally supported in a thrust direction by a fluid pressure that is generated in a thrust bearing gap between another end surface of the flange portion of the inner member and a bearing surface of the another thrust bearing foil, the spacer has a communication hole formed to communicate an inner periphery and an outer periphery of the spacer to each other, and a communication path is formed between the inner peripheral surface of the hollow sleeve portion and an outer peripheral surface of the rotary shaft, the communication path being configured to communicate the radial bearing gap and an outside to each other.

2. The foil bearing unit according to claim 1, wherein the hollow sleeve portion of the shaft portion and the flange portion are formed integrally with each other.

3. The foil bearing unit according to claim 1, further comprising another radial bearing foil mounted to an inner peripheral surface of the second foil holder, wherein the inner member is further supported in the radial direction by a fluid pressure that is generated in a radial bearing gap between the outer peripheral surface of the shaft portion of the inner member and a bearing surface of the another radial bearing foil.

4. A foil bearing unit, comprising:
a first foil holder formed of a single component;
a radial bearing foil mounted to an inner peripheral surface of the first foil holder;
a thrust bearing foil mounted to an end surface of the first foil holder; and
an inner member;
a mounting member arranged on an outer periphery of the first foil holder; and
a damper configured to couple the first foil holder and the mounting member to each other, wherein
the inner member comprises:
a shaft portion to be inserted along an inner periphery of the first foil holder; and
a flange portion projecting radially outward from the shaft portion,
the inner member is supported in a radial direction by a fluid pressure that is generated in a radial bearing gap between a bearing surface of the radial bearing foil and an outer peripheral surface of the shaft portion,
the inner member is further supported in a thrust direction by a fluid pressure that is generated in a thrust bearing gap between a bearing surface of the thrust bearing foil and one end surface of the flange portion, and
the damper is deformed to allow the first foil holder to move relative to the mounting member.

5. A foil bearing unit, comprising:
a first foil holder formed of a single component;
a radial bearing foil mounted to an inner peripheral surface of the first foil holder;
a thrust bearing foil mounted to an end surface of the first foil holder; and
an inner member, wherein
the inner member comprises:
a shaft portion to be inserted along an inner periphery of the first foil holder; and
a flange portion projecting radially outward from the shaft portion,
the inner member is supported in a radial direction by a fluid pressure that is generated in a radial bearing gap between a bearing surface of the radial bearing foil and an outer peripheral surface of the shaft portion,
the inner member is further supported in a thrust direction by a fluid pressure that is generated in a thrust bearing gap between a bearing surface of the thrust bearing foil and one end surface of the flange portion, and
at least a part of the inner member is made of a carbon fiber reinforced composite.

6. The foil bearing unit according to claim 5, wherein the carbon fiber reinforced composite comprises a C/C composite.

7. The foil bearing unit according to claim 5, wherein the flange portion is made of the carbon fiber reinforced composite.

8. The foil bearing unit according to claim 5, wherein the flange portion and the shaft portion are made of materials different from each other.

9. The foil bearing unit according to claim 8,
wherein the flange portion is made of the carbon fiber reinforced composite, and
wherein the shaft portion is made of a sintered carbon material.

10. The foil bearing unit according to claim 9, wherein the shaft portion is arranged in a horizontal direction.

11. The foil bearing unit according to claim 5, wherein the flange portion and the shaft portion abut against each other in an axial direction.

12. The foil bearing unit according to claim 11, wherein an inner peripheral surface of the flange portion and the outer peripheral surface of the shaft portion are fitted to each other.

* * * * *